United States Patent [19]

Hughes et al.

[11] Patent Number: 5,068,757

[45] Date of Patent: Nov. 26, 1991

[54] SERVO TRACKING FOR HELICAL SCAN RECORDER

[75] Inventors: Timothy C. Hughes, Lafayette; Steven P. Georgis, Boulder, both of Colo.

[73] Assignee: Exabyte Corporation, Boulder, Colo.

[21] Appl. No.: 433,977

[22] Filed: Nov. 9, 1989

[51] Int. Cl.[5] ............................................. G11B 5/588
[52] U.S. Cl. ................................................ 360/77.130
[58] Field of Search ..................................... 360/77.13

[56] References Cited

U.S. PATENT DOCUMENTS

| | | | |
|---|---|---|---|
| 4,651,239 | 3/1987 | Omori et al. | 360/77 |
| 4,665,447 | 5/1987 | Odaka | 360/77.14 |
| 4,677,504 | 6/1987 | Yamazaki | 360/77 |
| 4,714,971 | 12/1987 | Sigiki et al. | 360/77 |
| 4,739,420 | 4/1988 | Odaka et al. | 360/77 |
| 4,835,628 | 5/1989 | Hinz et al. | 360/48 |
| 4,843,495 | 6/1989 | Georgis | 360/77.15 |
| 4,845,577 | 7/1989 | Georgis et al. | 360/72.2 |

Primary Examiner—Aristotelis Psitos
Assistant Examiner—David L. Robertson
Attorney, Agent, or Firm—Griffin, Branigan & Butler

[57] ABSTRACT

In a servo tracking method and apparatus, a servo head (S) of a helical scan recorder (30) endeavors to travel equidistant between two servo signal-bearing stripes recorded on the tape (32). The recorder (30) determines a reference-crossing time at which the servo head (S) begins to cross a horizontal reference line (606) drawn with respect to the beginning of a stripe on the tape (32). The servo head (S) samples the amplitude of a servo signal provided on the tape (32) at a plurality of predetermined times after the reference-crossing time. A servo tracking circuit (175) uses the amplitude of the servo signal at the predetermined sampling times to determine how to adjust the position of said head (S) relative to the pitch of said stripe.

24 Claims, 14 Drawing Sheets

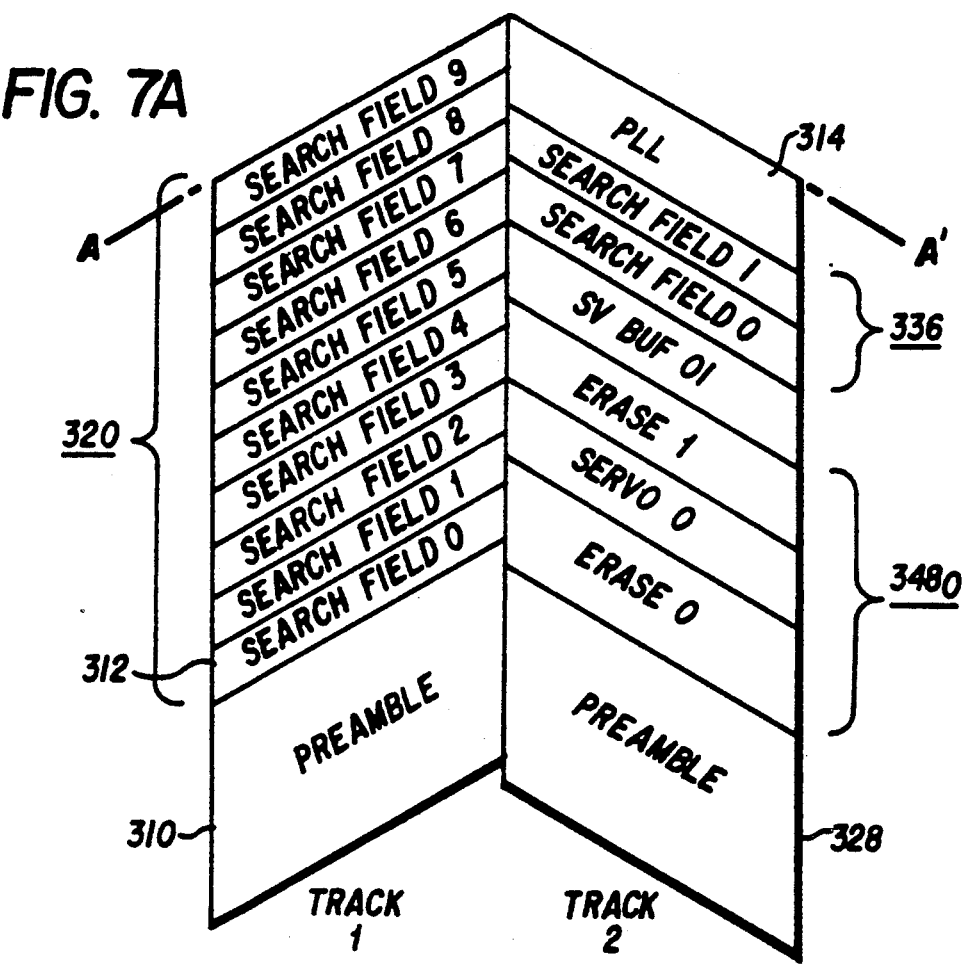

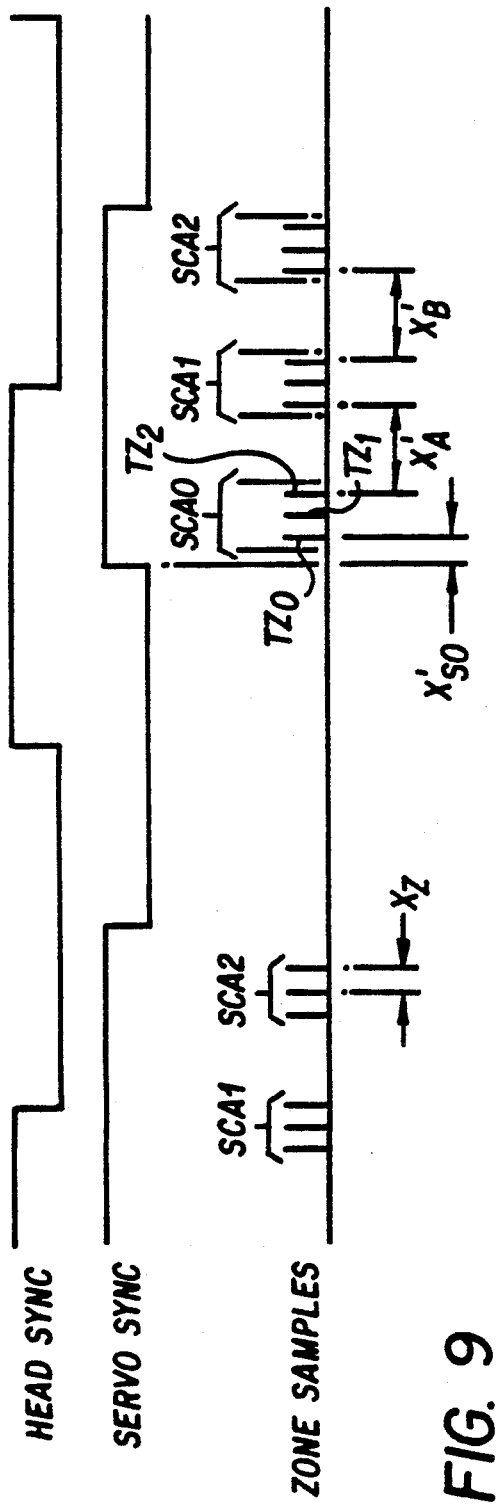
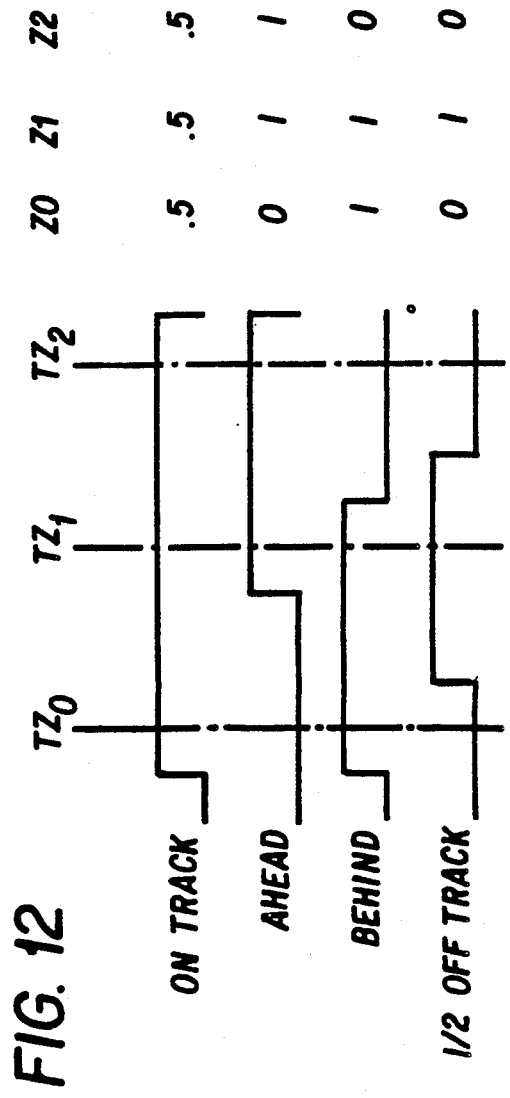
FIG. 9
FIG. 12

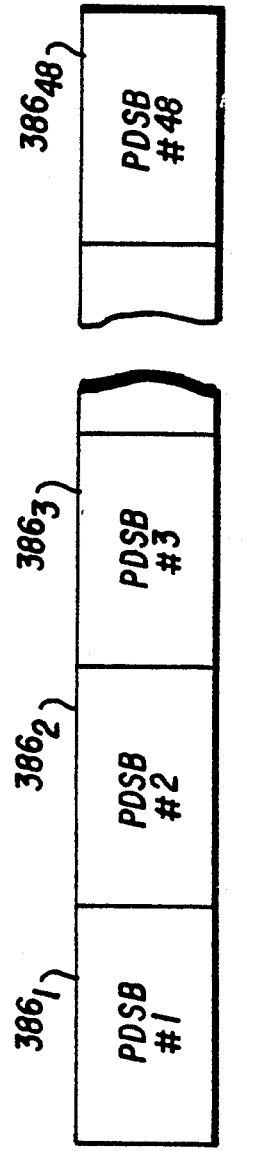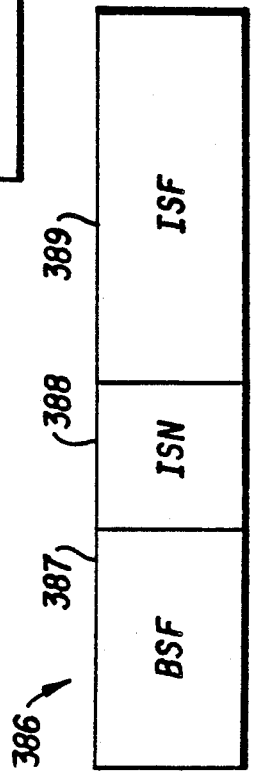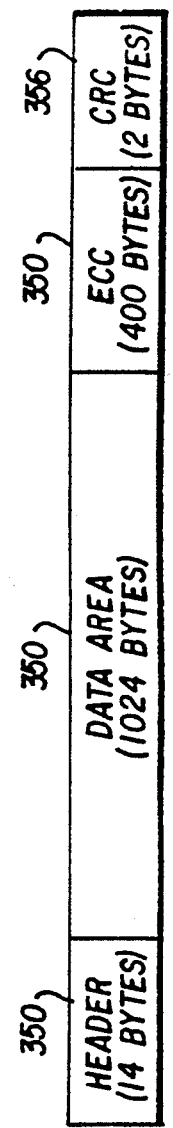

5,068,757

SERVO TRACKING FOR HELICAL SCAN RECORDER

BACKGROUND

1. Field of Invention

This invention pertains to method and apparatus for recording and reading information stored in helical stripes on magnetic tape, and particularly to method and apparatus tracking servo signals embedded in helical stripes on magnetic tape.

2. Prior Art and Other Considerations

Numerous prior art patents teach the recording and reading of information stored in helical stripes on magnetic tape. In a helical scan arrangement, travelling magnetic tape is partially wrapped around a rotating drum so that heads positioned on the drum are contiguous to the drum as the drum is rotated. A write head on the drum physically records data on the tape in a series of discrete stripes oriented at an angle with respect to the direction of tape travel. The data is formatted, prior to recording on the tape, to provide sufficient referencing information to enable later recovery during readout.

Among such prior art teachings are the following United States Patents, all commonly assigned herewith and incorporated herein by reference:

(1) U.S. Pat. No. 4,843,495 to Georgis et al., entitled CYCLICAL SERVO ZONE TRACKING METHOD AND APPARATUS FOR HELICAL SCAN RECORDING-DEVICES;

(2) U.S. Pat. No. 4,835,628 to Hinz et al., entitled APPARATUS AND METHOD FOR FORMATTING AND RECORDING DIGITAL DATA ON MAGNETIC TAPE; and, (3) U.S. Pat. No. 4,845,577 to Georgis et al., entitled APPARATUS AND METHOD FOR ENABLING RAPID SEARCHING OF HELICALLY RECORDED MAGNETIC TAPE.

Helical scan recorders require that the read and write heads be correctly aligned with the stripes of recorded information on the magnetic tape. To this end, servo signals, sometimes referred to as "pilot" signals, are embedded in servo "zones" in each stripe. Typically there are a plurality of servo zones on each stripe.

In some prior art helical scan systems, such as U.S. Pat. No. 4,843,495 to Georgis et al. referenced above, a read head dually functions to detect servo signals provided in a stripe and to read the informational data provided in the stripe. Upon detection of the servo signals by the read head, the system determines if the position of the heads on the drum need be adjusted for correct alignment with the stripes. In other prior art helical scan systems, a special servo head is provided on the drum to detect the servo signals and determine whether head adjustment is needed.

Dual azimuth helical scan arrangements are also known. In dual azimuth helical scan systems, a first head reads or writes stripes at a first azimuthal angle, while a second head reads or writes stripes at a second azimuthal angle. A plurality of servo zones is provided in each stripe. Examples of such dual azimuth helical scan servo arrangements include U.S. Pat. No. 4,528,605 to Hiraguri, U.S. Pat. No. 4,581,662 to Sato, and U.S. Pat. No. 4,665,447 to Odaka.

In the prior art, the servo signals are usually of very low frequency, e.g., a frequency far below the frequency range used for recording data. The prior art shows servo signals written at a low frequency, so as not to be confused with data and not to be subject to azimuth loss, especially in embodiments wherein a read head also serves as a servo head. Unfortunately, low frequency signals are difficult to erase, particularly by overwriting. This limits the number of times a tape can be written, and reduces servo integrity each time.

Prior art helical scan servo systems also consume a significant extent of the tape format. In this respect, the low frequency servo signals must be written in large servo zones, since the number of signal transitions per stripe length is low. In addition, in the prior art the servo zones are conventionally written on each stripe.

In the prior art, servo heads typically attempt to evenly straddle two adjacent stripes. The servo head compares the amplitudes of the signals derived from the servo zones of the two adjacent stripes. In the prior art, if the servo head is off-track by one half track pitch or less, the positional adjustment is relatively easily made. In this regard, in a region wherein the servo head is off-track by one half the track pitch or less, there is a linear relationship between the difference of the compared amplitudes and the extend of required displacement of the servo head to equalize those amplitudes. Thus, in this linear region, a positional adjustment can easily be made to equalize the amplitudes of the servo signals from the two stripes.

Difficulties arise when the servo head is off-track by more than one half the track pitch. The non-linearity hampers a determination of the extent and direction of necessary servo movement in order to obtain the desired on-track condition. The mere comparison between the two servo signal amplitudes does not yield a result that can be used as input for the servo repositioning mechanism.

Accordingly, it is an object of the present invention to provide an accurate and efficient servo method and apparatus for a helical scan recorder.

An advantage of the present invention is the provision of servo tracking method and apparatus that accurately and efficiently determines the degree of correction required in order to properly align heads with a helical stripe on magnetic tape.

Another advantage of the present invention is the provision of servo tracking method and apparatus which reduces the degree of tape format dedicated to servo tracking.

Yet another advantage of the present invention is the provision of servo tracking method and apparatus which facilitates the use of a broad spectrum of frequencies for use as servo signals.

SUMMARY

In a servo tracking method and apparatus, a servo head of a helical scan recorder endeavors to travel equidistant between two servo signal-bearing stripes recorded on the tape. The recorder determines a reference-crossing time at which the servo head begins to cross a horizontal reference line drawn with respect to the beginning of a stripe on the tape. The servo head samples the amplitude of a servo signal provided on the tape at a plurality of predetermined times after the reference-crossing time. A servo tracking circuit uses the amplitudes of the servo signal at the predetermined sampling times to determine how to adjust the position of said head relative to the pitch of said stripe.

The time at which the servo head crosses the reference line is established with reference to the leading edge of a signal SERVO SYNC. Given the known format of each stripe, including the precise location the beginning of the servo zones in each stripe, the time required for a perfectly aligned servo head to travel, from the reference line to each servo zone is known and used for determining a sampling time. Whenever the servo head becomes misaligned, the center of the servo head crosses the reference line at a different point, e.g., a point on the reference line not precisely between the center lines of the two servo-signal bearing stripes. Given the geometry of the helical recording format, the time required for the servo head to travel between this different point on the reference line to each servo zone varies from perfectly alignment conditions. As a result, the amplitude of the servo signal varies at the sampling times.

Utilization of the rising edge of the SERVO SYNC signal enables the sampling of servo signal amplitude in a strategic manner that reveals both the direction and extent to which a servo head must be displaced in order to become on-track. The technique of the invention overcomes the non-linearity suffered when servo heads are off-track by more than ½ track pitch.

Moreover, relative to the SERVO SYNC signal, the helical scan system is able to precisely determine when servo areas should be encountered on a stripe. Preknowledge of the location of the servo areas and of the time at which the servo head is expected to arrive at the servo areas facilitates a the use of smaller servo area, leaving more of the tape available for other purposes. In addition, the exactitude of the servo aspects of the helical scan system described herein permit the use of servo signals of frequencies higher than those required by the prior art.

In a dual azimuthal embodiment, the servo head follows stripes recorded at a first azimuthal angle A1. The stripes recorded at the first azimuthal angle A1 alternate in sequence with stripes recorded at a second azimuthal angle A2. Servo zones including the servo signal need be provided only on the stripes recorded at the second azimuthal angle A2. The servo head has a width equal to two track widths (or "pitches"), so that when traveling over a stripe recorded at angle A1 the servo head can detect the servo signals on the two adjacent stripes recorded at angle A2.

The beginnings of two servo signal-bearing stripes are separated by a distance $X_{to}$ along the azimuthal angle at which the two servo signal-bearing stripes are recorded. The servo signal is recorded in servo zones which extend a distance $X_{sa}$ along the stripes, and $X_{to} = X_{sa}$.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale; emphasis instead being placed upon illustrating the principles of the invention.

FIGS. 7A–7C are views depicting the format of Track 1 and Track 2 of a magnetic tape recorded by or readable by the helical scan system of the embodiment of FIG. 1.

FIG. 9 is a timing diagram showing HEAD SYNC and SERVO SYNC signals utilized by the helical scan system of the embodiment of FIG. 1.

FIG. 12 is a signal diagram showing the relative amplitudes of servo sub-zone signals under three example conditions as generated by the helical scan system of the embodiment of FIG. 1.

FIG. 14 is a schematic view depicting the format of a physical data block included on a stripe of magnetic tape recorded by or readable by the helical scan system of the embodiment of FIG. 1.

FIG. 15 is a schematic view depicting the format of a data area including a plurality of data sub-blocks recorded by or readable by the helical scan system of the embodiment of FIG. 1.

FIG. 16 is a schematic view depicting the format of a data sub-block recorded by or readable by the helical scan system of the embodiment of FIG. 1.

DETAILED DESCRIPTION OF THE DRAWINGS

Figure 1:
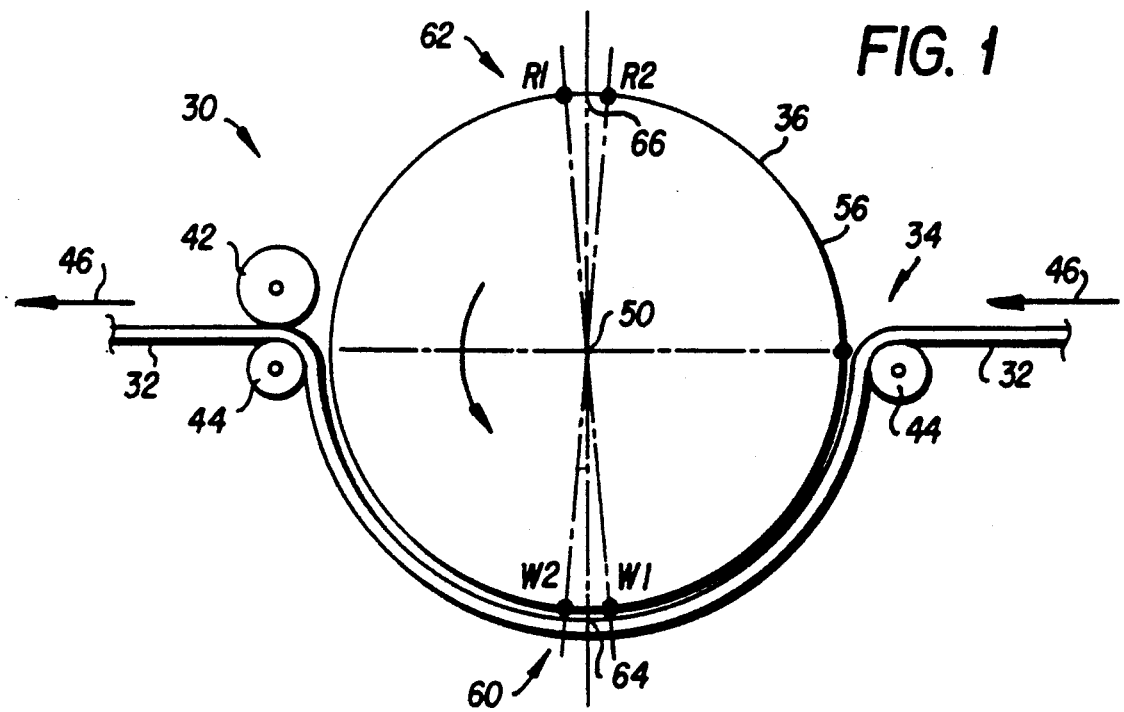
FIG. 1 is a schematic view of head placement on a drum of a helical scan system of an embodiment of the invention.

FIG. 1 shows drum and transport portions of a helical scan system 30 for recording digital information on magnetic tape 32. The helical scan system 30 includes a tape transport 34 and a rotating drum 36.

The tape transport 34 includes a capstan 42 and two tape guides 44. In conventional manner, the capstan 42 is rotated by an unillustrated capstan drive motor in order to move the tape 32 in a direction of tape travel indicated by arrows 46. In the illustrated embodiment, the capstan 42 rotates to transport the tape 32 at a speed on the order of about one-half inch per second.

DRUM AND HEAD STRUCTURE

Figure 2:
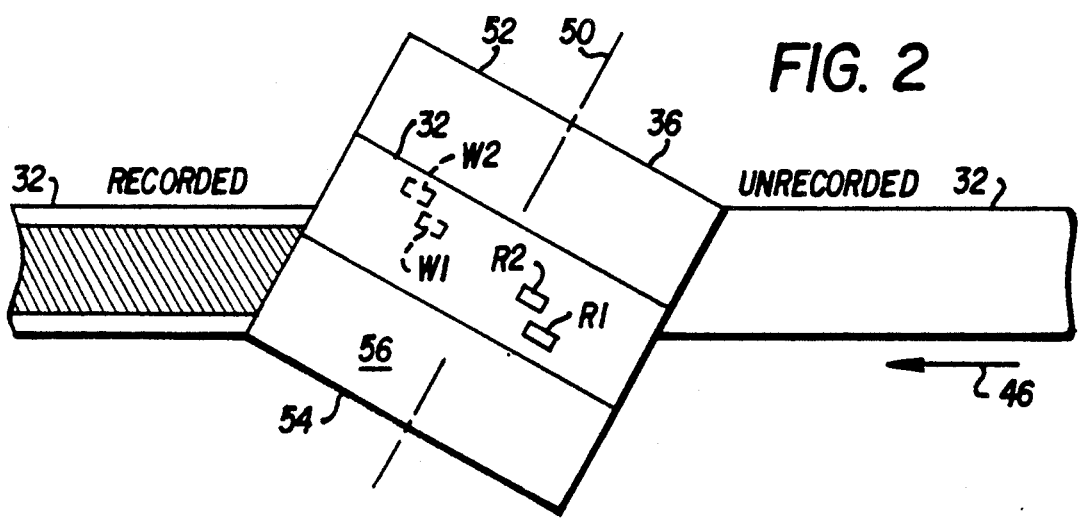
FIG. 2 is a schematic view of the helical scan system of the embodiment of FIG. 1 recording stripes on magnetic tape.

The drum 36 is rotatable about drum axis 50. The drum is rotated at a velocity of about 1800 rpm by an unillustrated drum motor. An unillustrated tachometer detects rotations of the drum motor shaft, and hence of the drum, and produces a DRUM SYNC signal. As shown in FIG. 2, drum axis 50, and hence drum 36, is angularly oriented with respect to the edges and direction of travel of the tape 32. The drum 36 has a drum upper surface 52 and a drum lower surface 54, both of which are planar. The drum axis 50 is orthogonal to both the drum upper surface 52 and the drum lower surface 54. The drum 36 also has a peripheral surface 56 which wraps around the circumference of the drum 36.

The peripheral surface 56 of the drum 36 has two sets of heads mounted thereon, in particular a first set of heads comprising write heads W1 and W2 and a second set of heads comprising read heads R1 and R2. In addition, the peripheral surface 56 of the drum 36 has a servo head S mounted thereon.

Figure 6:
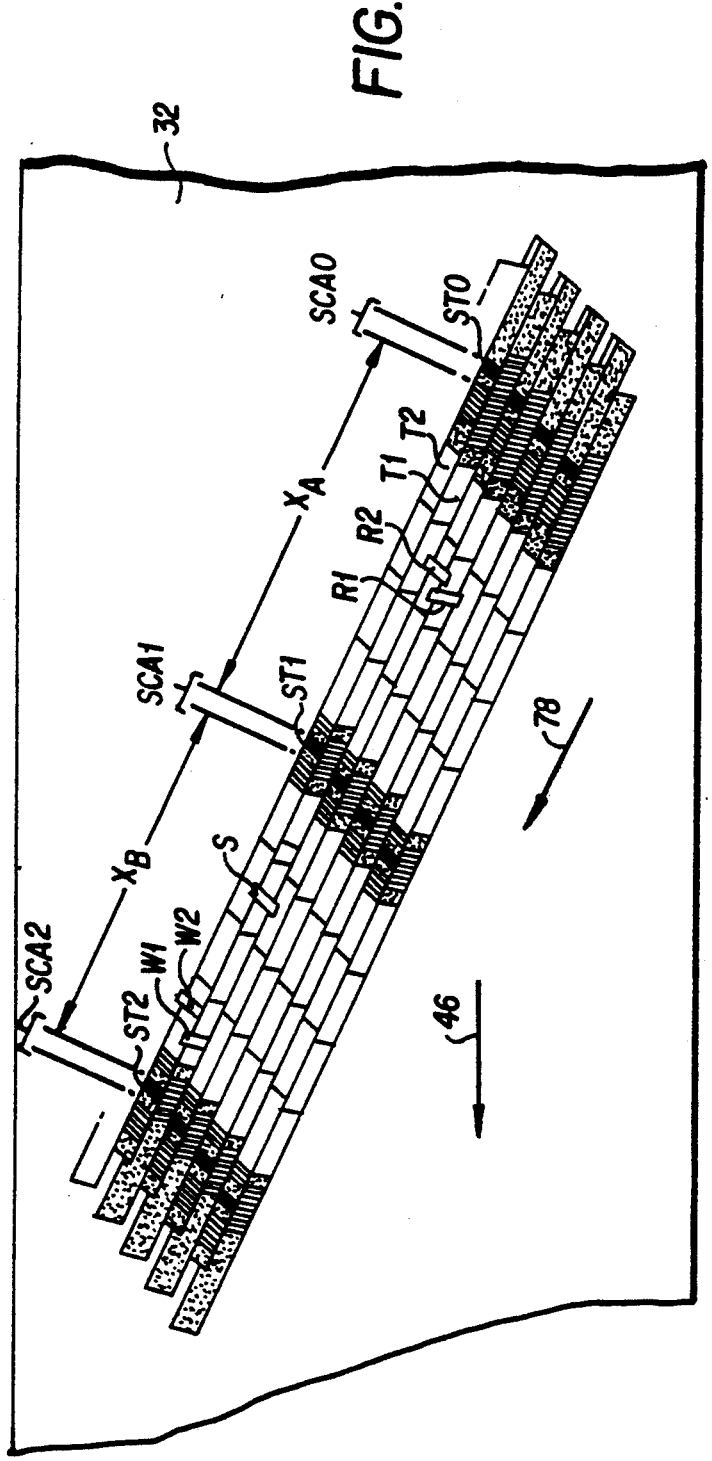
FIG. 6 is a schematic view of a plurality of stripes recorded on magnetic tape by the helical scan system of the embodiment of FIG. 1, and further showing paths of travel of heads provided on the drum of the helical scan system of the embodiment of FIG. 1.

The heads W1, W2, R1, and R2 are mounted to generate helical stripes on the magnetic tape 32 in the manner shown in FIG. 6. Heads W1 and W2 essentially simultaneously write first and second tracks of data, i.e., tracks T1 and T2, respectively, on the tape 32. Heads R1 and R2 are positioned to read tracks T1 and T2, respectively, 180 degrees after the tracks T1 and T2 are written. In this respect, although FIG. 6 shows write heads W1, W2 and read heads R1, R2 traveling over tracks T1 and T2 for the sake of depicting head placement relative to the tracks, it should be understood the read heads R1, R2 and the write heads W1, W2 cannot simultaneously be over the tracks in the manner depicted in FIG. 6. Likewise, the inclusion of the servo head S in FIG. 6 is merely to show the position of the servo head S relative to the tracks T1 and T2, and not in relationship to the read heads R1, R2 or the write heads R1, R2.

In the above regard, four geometrical factors regarding the heads are strategic to enable the simultaneous writing by heads W1 and W2 and the subsequent respective reading by corresponding heads R1 and R2; the angular separation of the heads about the drum peripheral surface 56; the axial location of the heads relative to one another; the width of the heads; and, the azimuthal orientation of the heads. These geometrical factors are explained further in simultaneously-filed U.S. patent application Ser. No. 07/433,961 entitled DUAL CHANNEL HELICAL SCAN RECORDER, which is incorporated herein by reference.

FIG. 6 shows a plurality of helical stripes recorded on magnetic tape 32 by the helical scan system 30, and the ultimate paths of travel of the heads W1, W2, R1, and R2, as well as the servo head S over the helical stripes. The direction of movement of the heads is depicted by arrow 78 in FIG. 6.

Thus it is seen that a dual channel helical scan system 20 is provided, with a first channel including the heads W1 and R1, and a second channel including the heads W2 and R2. The employment of two channels effectively doubles the data transfer rate, since twice as many tracks are written to tape per revolution of the drum 36. For checking purposes, the heads R1 and R2 read back the two simultaneously written tracks approximately 180 degrees after the tracks are written. The write and read functions occur exclusively, thereby eliminating any crosstalk problems.

SYSTEM STRUCTURE

Figure 4:
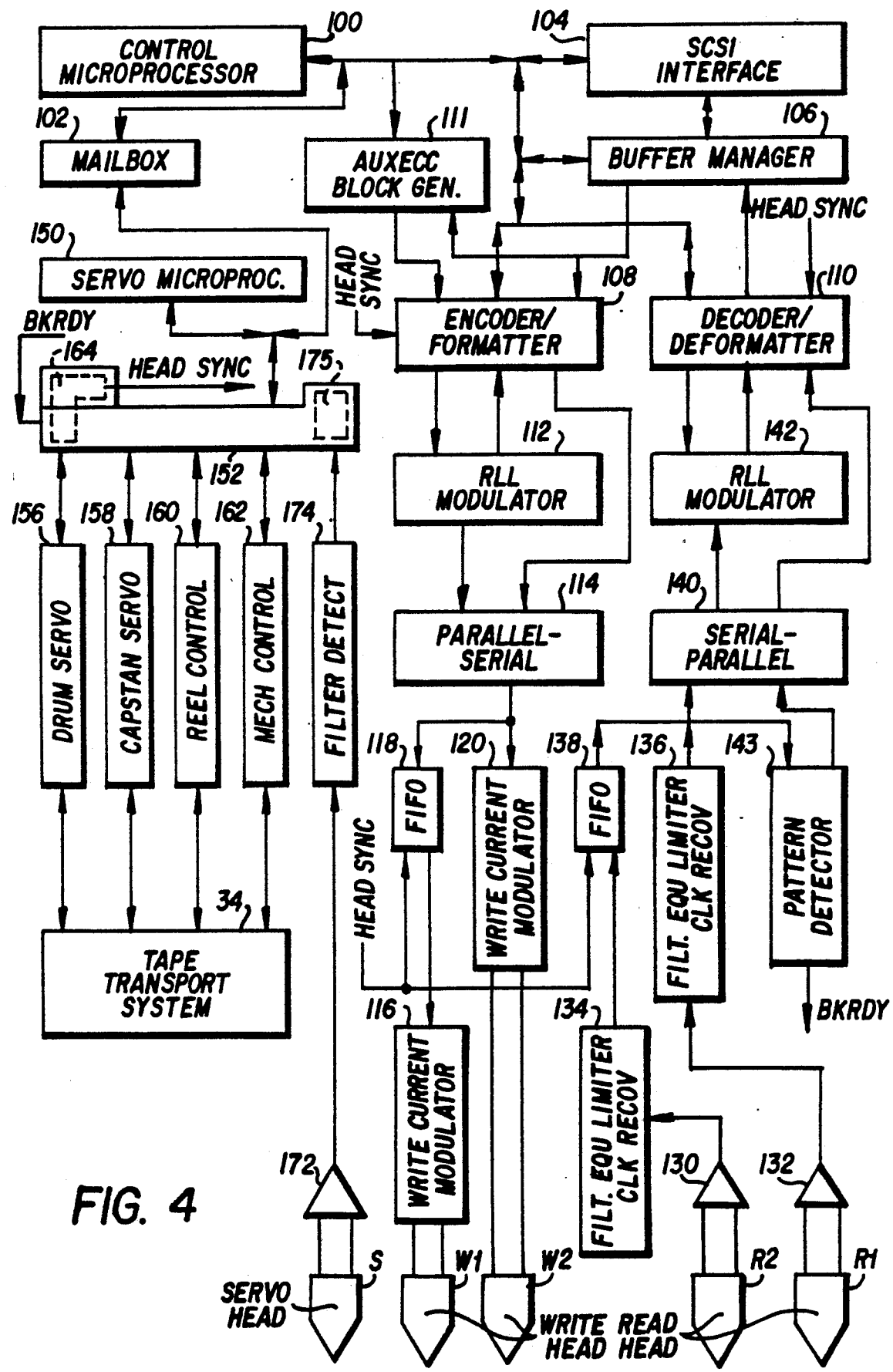
FIG. 4 is a schematic view of the helical scan system facilitating the head placement on a drum according to the embodiment of FIG. 1.

FIG. 4 illustrates the overall helical scan system 30, including the read heads R1, R2, the write heads W1, W2, and the servo head S. The helical scan system 30 further includes a control microprocessor 100 which communicates primarily with a mailbox 102; a SCSI interface 104; a data buffer manager 106; an encoder/formatter 108; a decoder/de-formatter 110; and, an AUXECC block generator 111.

The data buffer 106 manager comprises a data buffer which includes 1 MByte of DRAM is organized as a 9-bit wide, dual-port, circular memory. Data transfers between the data buffer manager 106 and the SCSI interface 104, the encoder/formatter 108, the decoder/deformatter 110, and the AUXECC block generator 111 occur asynchronously or synchronously. Logical user data blocks are formatted into physical blocks in the data buffer 106 for recording onto tape.

The AUXECC block generator 111 produces auxiliary error correction blocks for recording error correction stripes on the tape 32. The structure and operation of the AUXECC block generator is described in simultaneously filed U.S. patent application Ser. No. 07/434,009 ERROR CORRECTION METHOD AND APPARATUS, which is incorporated herein by reference.

The encoder/formatter 108 receives data blocks from the data buffer manager 106 and from the AUXECC block generator 111. The encoder/formatter 108 performs a variety of functions, including appending error correction code (ECC) information, inserting synchronization markers, inserting search fields, and inserting servo fields and perform interleave sequencing of bytes. The encoder/formatter 108 transmits the data blocks and appended information to a RLL Modulator 112 which performs the run-length encoding of the data stream by translating each 8 bit byte to a 10-bit word. The 10-bit word is then, transmitted to a bit serializer 114. The bit serializer 114 is connected to a write driver circuit 116 (for write head W1) through a FIFO register 118, and to a write driver circuit 120 (for write head W2). The function of the FIFO register 118 will be explained below in connection with the description of the write operation of the helical scan system 30.

The read heads R2 and R1 are connected to preamplifiers 130 and 132, respectively, for amplifying a read signal. The preamplifiers 130 and 132 are connected to signal conditioning circuits 134 and 136, respectively. The signal conditioning circuits 134 and 136 include circuits for amplitude sensing, equalization, and data clocking and detection.

The signal conditioning circuit 134 is connected to FIFO register 138, which in turn is connected to a serial-to-parallel converter 140. The signal conditioning circuit 136 is connected directly to the serial-to-parallel converter 140.

The serial-to-parallel converter 140 is connected to an RLL De-Modulator 142 and to a pattern detector circuit 143. The RLL Read Modulator basically performs the inverse operations of the corresponding RLL Write Modulator 112.

The pattern detector 143 monitors the incoming stream of data in order to recognize a synchronization field. When the pattern detector 143 has recognized a predetermined number of synchronization fields having a predetermined spacing, the pattern detector 143 generates a BKRDY signal. In addition, the pattern detector 143 supplies to the serial-parallel converter 140 synchronizing signals necessary for the operation of the converter 140.

The RLL De-Modulator 142 is connected to the decoder/de-formatter 110. The decoder/de-formatter 110 assembles data blocks and performs error correction.

The microprocessor 100 communicates through its mailbox 102 with a servo microprocessor 150 and a motion control system 152. The motion control system 152 includes a dedicated microprocessor for communicating with a drum servo 156; a capstan servo 158; reel control circuits 160; and a mechanical controller 162. In addition, upon receipt of the BKRDY signal generated by the pattern detector 143, the motion control system 152 includes circuitry, herein called HEAD SYNC generator 164, for developing a HEAD SYNC signal. The HEAD SYNC generator 164 is described in simultaneously-filed U.S. patent application Ser. No. 07/434,008 entitled METHOD AND APPARATUS FOR SYNCHRONIZING TIMING SIGNALS, which is incorporated herein by reference. The HEAD SYNC signal is high when the read heads R1 and R2 are over the helical stripes of Track 1 and Track 2. The HEAD SYNC signal is low when the write heads W1 and W2 are over the stripes of Track 1 and Track 2.

The motion control system 152 also communicates with sensor interface circuits for the various unillustrated elements including the following: a drum tachometer; a capstan tachometer; a reel tachometer; an end of tape (EOT) detector; and, a beginning of tape (BOT) detector. As shown in FIG. 4, the tape transport system 34 is connected to the drum servo 156, the capstan servo 158, the reel control 160, and the mechanical controller 162.

The servo head S has its output signal connected to preamplifier 172. The output of the servo preamplifier 172 is applied to a filter and detection circuit 174 which filters the amplified signal and for detecting the servo signals recorded on tape. The filter and detection circuit 174 is in turn connected to a servo tracking circuit 175 included in the motion control system 152.

TAPE FORMAT

Figure 5:
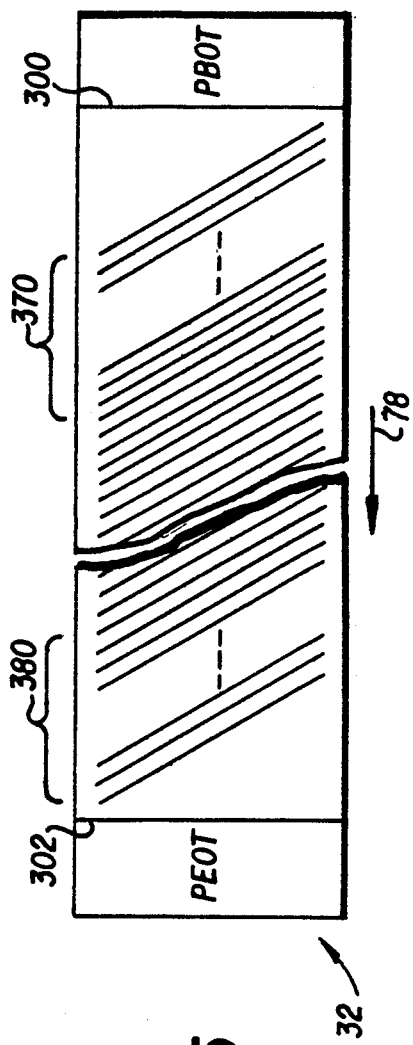
FIG. 5 is a schematic view depicting the format of a magnetic tape recorded by or readable by the helical scan system of the embodiment of FIG. 1.

FIG. 5 depicts the format of magnetic tape 32 for the helical scan system 30. The tape 32 has a physical beginning of tape (PBOT) 300 located at the point where a translucent leader material is attached to the magnetic media. Downstream from the PBOT 300 (in the sense of direction of tape transport as shown by arrow 78) are a multitude of helical stripes formed on the magnetic tape media. The helical stripes contain, of course, the information written by the write heads W1 and w2 and read by the read heads R1 and R2. The format of the helical stripes is discussed subsequently in connection with FIGS. 6 and 7. At the end of the tape 32 is a physical end of tape (PEOT) 302.

Since the helical scan system 30 is a dual azimuthal system, in a write mode odd numbered helical stripes are written at a first azimuthal angle A1 by write head W1 and even numbered helical stripes are written at a second azimuthal angle A2. In a read or readback mode, odd numbered helical stripes are read at a first azimuthal angle A1 by write head W1 and even numbered helical stripes are read at a second azimuthal angle A2. As can be discerned from the foregoing, the first azimuthal angle A1 is +20 degrees; the second azimuthal angle A2 is −10 degrees. As used hereinafter, any helical stripe written by write head W1 or read by read head R1 is referred to as "Track 1". Likewise, any helical stripe written by write head W2 or read by read head R2 is referred to as "Track 2".

TAPE FORMAT: TRACK 1

Figure 7B:
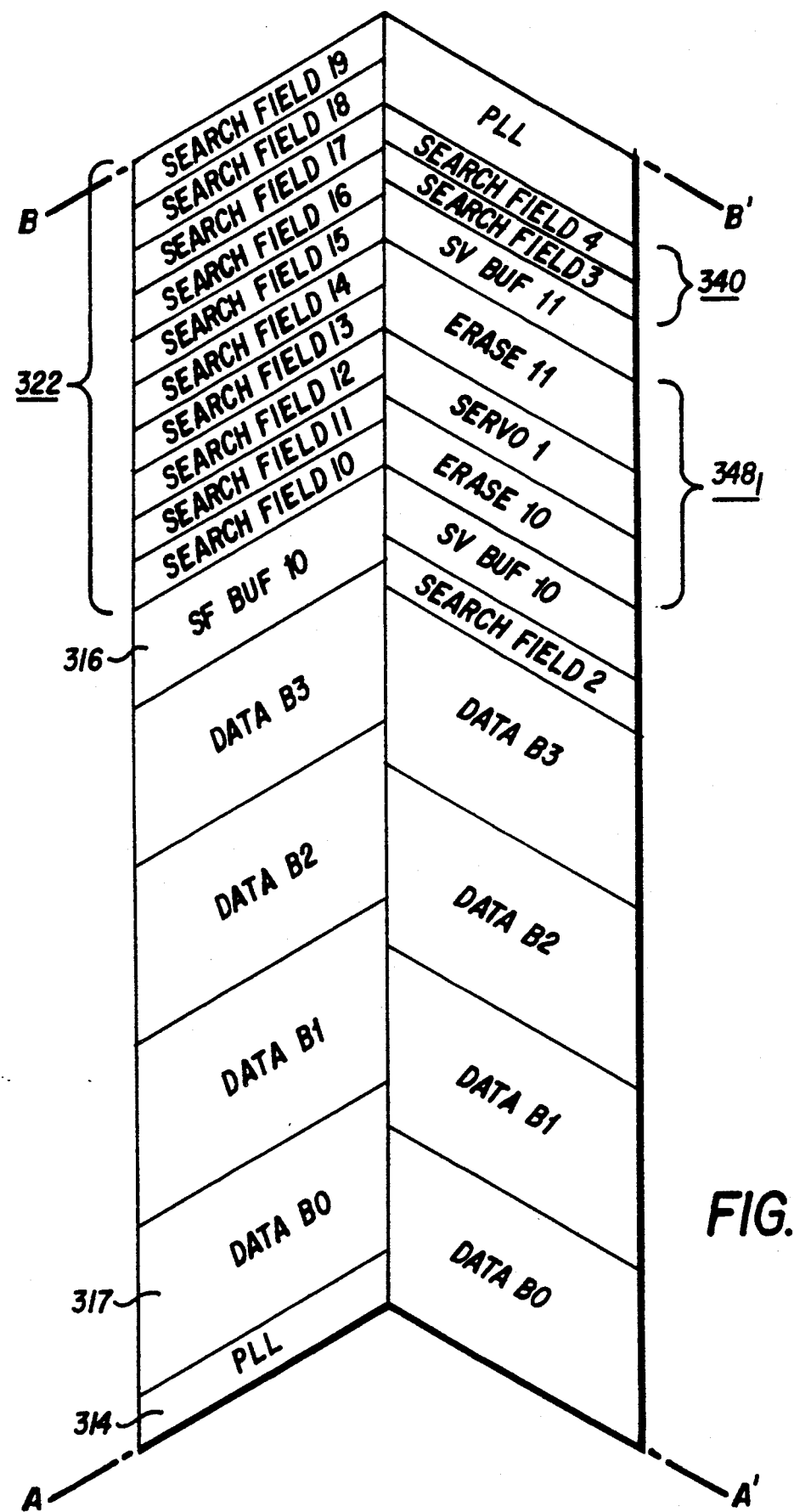
Figure 7C:
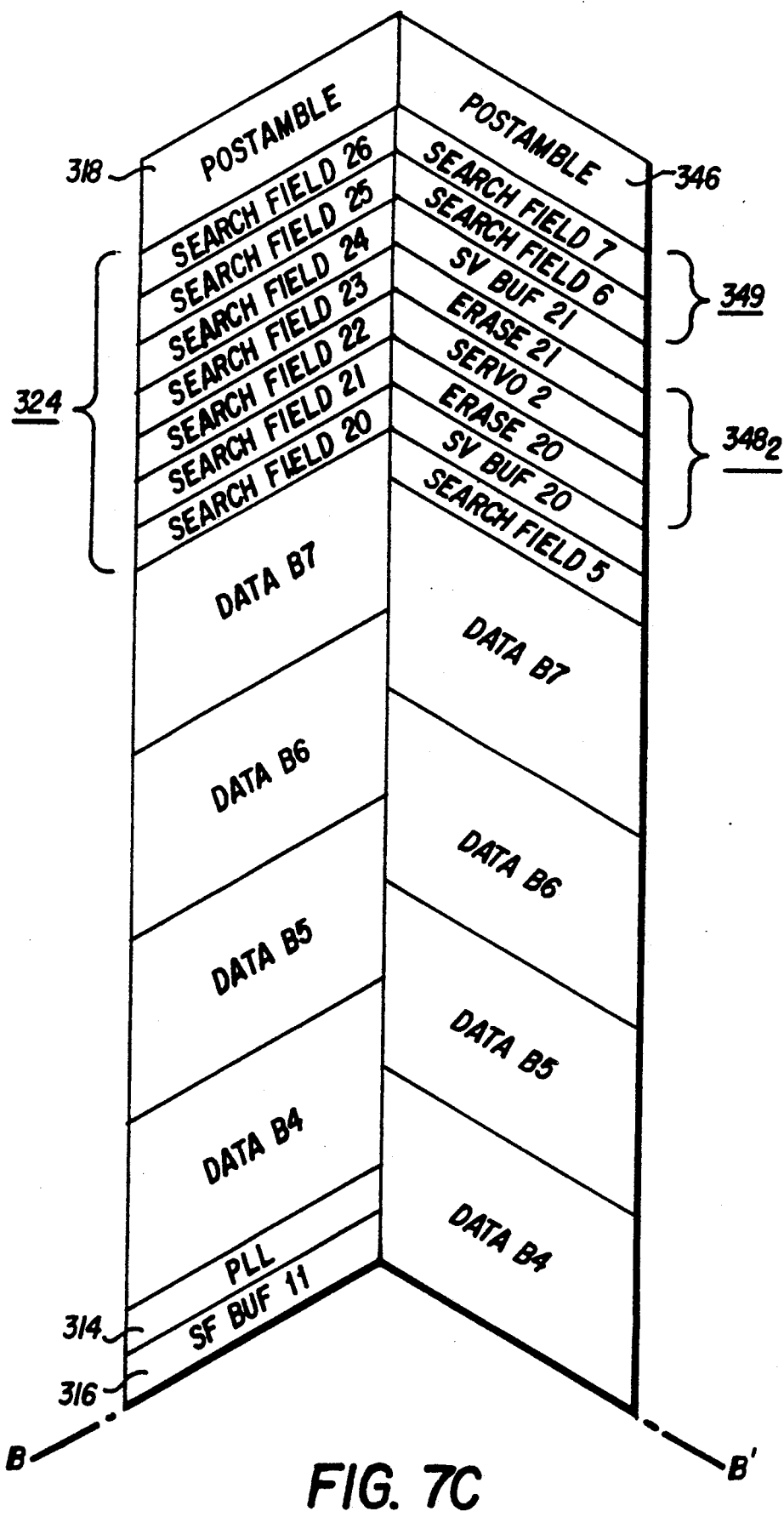

As indicated above, any helical stripe written by write head W1 or read by read head R1 is referred to as "Track 1". As shown in FIG. 7, Track 1 begins with begins with a Preamble field 310 and further includes a plurality of search fields 312; a plurality of data phase lock loop (PLL) fields 314; a plurality of search field buffers 316; a plurality of data blocks 317; and, a postamble 318. These fields are arranged in the following order (as reflected in FIG. 7): Preamble 310 a group 320 of ten search fields (SF0–9); a first PLL field 314; four data blocks 317 (blocks B0–B3); a search field buffer 316 (SF BUF 10); a group 322 of ten search fields (SF10–19); a search field buffer 316 (SF BUF 11); a second PLL field 314; four data blocks 317 (blocks B4–B7); a group 324 of seven search fields (SF20–26); and, the postamble 318.

Both Track 1 and Track 2 contain a plurality of search fields (SF) 312 used for high speed search (HSS) of the tape. The search fields 312 are the only data on the tape 32 that are readable during high speed search.

Each search field 312 includes a sync subfield and a data subfield. The sync subfield consists of a 4.27 MHz signal, while the data subfield comprises data signals (28 bytes long). On Track 1 the search fields are organized as a series of alternating subfields. For example, in group 320, the sequence is a sync subfield for SF0; a data subfield for SF0; a sync subfield for SF1; a data subfield for SF1; a sync subfield for SF2; a data subfield for SF2; and so forth.

The search field buffers SF BUF consist of 55 consecutive digital "1"s for enabling a voltage controlled oscillator in the read circuits to lock onto data.

TAPE FORMAT: TRACK 2

Any helical stripe written by write head W2 or read by read head R2 is referred to as "Track 2". As shown in FIG. 7, Track 2 is formatted to have the following fields (in the following order): a preamble 328; a first erase field 330 ("ERASE 0"); a first servo tone area (also known as "SERVO 0" or "ST0"); a second erase field 330 ("ERASE 1"); a synchronization field known as SV BUF 01; a group 336 of search fields (SF0–1); a PLL field 314; four data blocks 317 (B0–B3); search field SF2; a synchronization field known as SF BUF 10; a third erase field ("ERASE 10"); a second servo tone area (also known as "SERVO 1" or "ST1"); a fourth erase field 330 ("ERASE 11"); a synchronization field known as SF BUF 11; a group 340 of two search fields (SF3–4); a PLL field 314; four data blocks (B4–B7); search field SF5; a synchronization field SV BUF 20; a fifth erase field 330 ("ERASE 20"); a third servo tone area (also known as "SERVO 2" or "ST3"); a sixth erase field 330 ("ERASE 21"); synchronization field SV BUF 21; a group 344 of search fields (SF6-7); and, a postamble 346.

The synchronization fields SV BUF consist of 160 consecutive digital "1"s for enabling a voltage controlled oscillator in the read circuits to lock onto data.

As with Track 1, on Track 2 the search fields are organized as a series of alternating subfields. However, in some instances the servo buffers SV BUF fulfill the function of a search field sync subfield, making the sync subfield unnecessary (as in the case of SF0 and SF3, for example).

Table 5 sets forth physical layout dimensions for Track 2. In Table 5, the length values are in units of micrometers; the time values are in units of microseconds.

TAPE FORMAT: SERVO FIELDS

The servo fields 348 are provided only on Track and are read by the servo head S. Each servo field 348 comprises one servo data tone burst (1.42 MHz) surrounded by an erase (margin) tone (4.27 MHz). Each servo field 348 is sandwiched by a preceding and succeeding servo buffer (SV BUF), which happens to be a synchronization field. As shown in FIG. 7 and Table 6, servo field $348_0$ occurs near the beginning of Track 2; servo field $348_1$ occurs near the middle of Track 2; and, servo field $348_2$ occurs near the end of Track 2.

Table 6 shows the precise locations, with reference to the beginning of Track 2, of the servo tone areas $ST_0$, $ST_1$, and $ST_2$ (and their neighboring erase fields 330) included in each servo field 348. In Table 6, the length values (e.g., the cumulative length from the beginning of Track 2) are in units of micrometers; the time values (e.g., cumulative time from the beginning of Track 2) are in units of microseconds.

TABLE 6

TRACK 2 CUMULATIVE PHYSICAL LAYOUT DIMENSIONS

| Item | Length | Bit Cells | Time |
|---|---|---|---|
| ERASE 0 | 1028 | 2300 | 269 |
| ST0 | 1384 | 3097 | 362 |
| ERASE 1 | 1740 | 3894 | 455 |
| ERASE 10 | 31095 | 69531 | 8134 |
| ST1 | 31451 | 70328 | 8227 |
| ERASE 11 | 31807 | 71125 | 8320 |
| ERASE 20 | 61162 | 136762 | 15999 |
| ST2 | 61581 | 137559 | 61518 |
| ERASE 21 | 61874 | 138356 | 61874 |

Further details of the recording parameters of the helical scan system 30, and of the format of Track 1 and Track 2, are understood with reference to simultaneously-filed U.S. patent application Ser. No. 07/433,961, entitled DUAL CHANNEL HELICAL SCAN RECORDER, which is incorporated herein by reference.

TAPE FORMAT: PHYSICAL AND LOGICAL BLOCKS

FIG. 14 shows the format of each of the data blocks 317. The format for the data blocks 317 is the same, regardless of whether the data block 317 is written on track 1 or Track 2. As shown in FIG. 14, each data block 317 (also known as a "physical data block") includes a physical block header 350 (of 14 bytes); a data area 352 (of 1024 bytes); an error correction code ("ECC") area 354 (of 400 bytes); and, a cyclical redundancy check ("CRC") area 356 (of 2 bytes).

The physical block header 350 is used to determine the type of information contained in the block 317, e.g., the block type, and how the information is stored. As indicated above, the header 350 consists of 14 bytes. The four lower order bits of byte 0 of the header 350 contain a value (identifier BLOCK TYPE) which indicates the typing of the block 317. The following hexadecimal values are associated with different block types: "0H" represents user data; "AH" represents a filemark; "CH" represents a logical beginning of tape (LBOT) write with retry; "DH" represents a LBOT write with no retry; "EH" represents a gap; and, "FH" represents end of data.

As indicated above, a BLOCK TYPE value of "0H" signifies that a physical block 317 contains user data. Such a block 317 is referred to as a User Data Block. A User Data Block is a physical block which can contain up to 1024 bytes of user data in the data area 352.

The physical data blocks 317 included in the first group 370 of 320 stripes recorded on the tape 32 (shown in FIG. 5) are logical beginning of tape (LBOT) blocks. Each of these blocks have the format of FIG. 14 and include a physical block header 350, a data area 352, an ECC area 354, and a CRC area 356. The physical data blocks 317 included in the last group 380 of 128 stripes recorded on the tape 32 (shown in FIG. 5) are End of Data blocks.

TAPE FORMAT: PHYSICAL DATA SUB-BLOCKS

As shown in FIG. 15, the data area 352 of each physical data block 317 is partitioned into a plurality of physical data sub-blocks $386_1$-$386_{48}$. As shown in FIG. 16, each data sub-block includes a bit synchronization field (BSF) 387; an information segment number (ISN) 388; and, an information segment field (ISF) 389.

The bit synchronization field 387 is a unique finite-length sequence or pattern which can be identified by the pattern detector 143. In the preferred embodiment, a 20 bit sequence is utilized with the sequence being 01111111111111111110. The bit synchronization field 387 provides a reference within the incoming serial bit stream of each data sub-block 386 for initiating decoding of 8/10 RLL information by the RLL De-Modulator 142.

The information segment number 387 which follows each bit synchronization field 386 is a 10-bit RLL sequence that provides a segment identifier for information in the information segment field (ISF) 389 that follows. The information segment field has 30 bytes of 10 bits of information each. There are 48 unique information segment numbers 388, which correspond to the 48 data sub-blocks 386 in each physical data block 317. The foregoing is discussed in greater detail, with examples of the values for the information segment numbers 388, in U.S. Pat. No. 4,835,628, which is incorporated herein by reference.

STRUCTURE: HEAD SYNC GENERATOR

Figure 13:
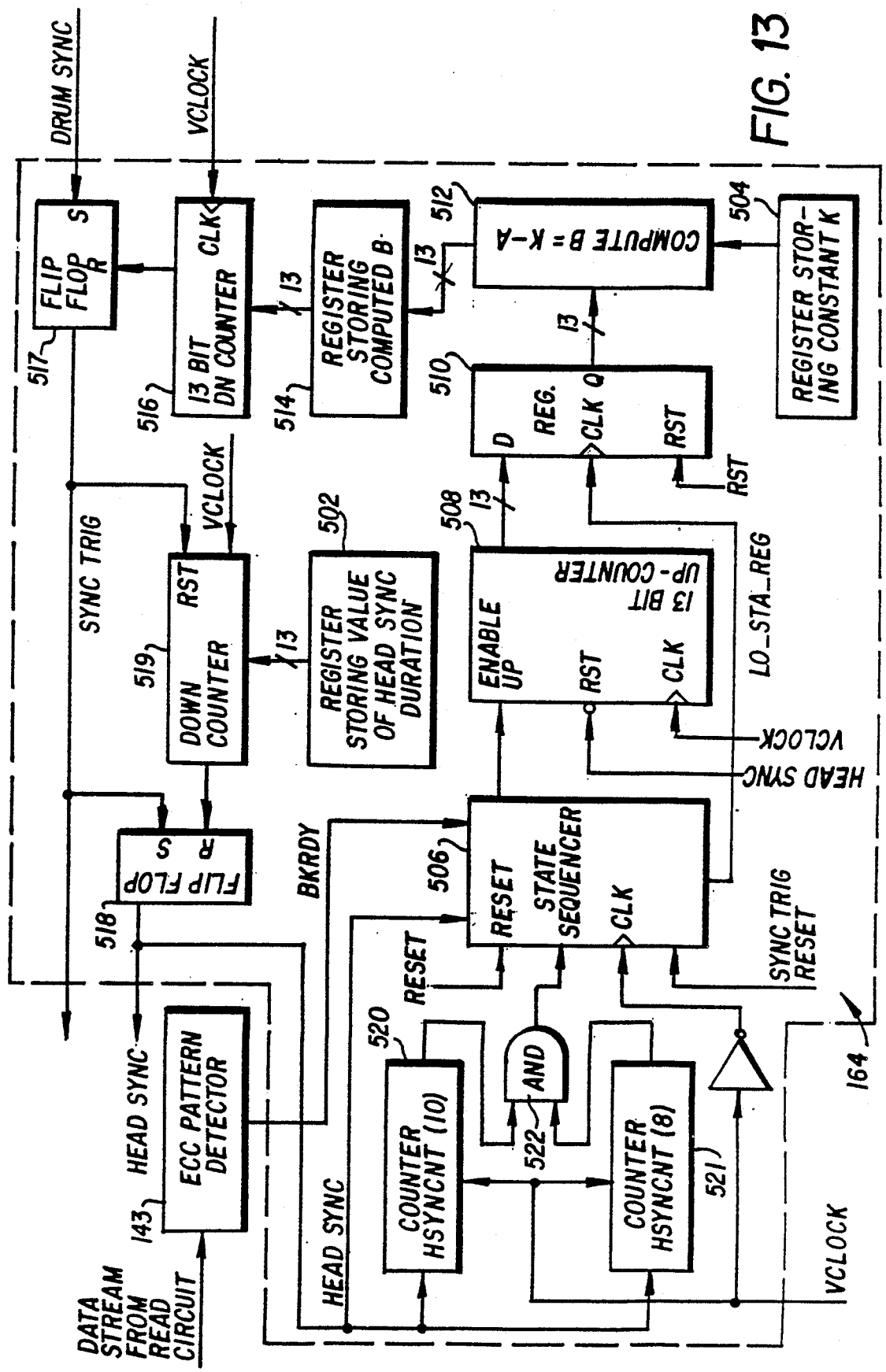
FIG. 13 is a schematic view of a HEAD SYNC generator included in the helical scan system of the embodiment of FIG. 1.

The HEAD SYNC generator 164 included in the motion control system 152, together with the pattern detector 143, is shown in greater detail in FIG. 13. The HEAD SYNC generator 164 has a number of its constituent elements connected to receive clock pulses from a system clock, as shown by inputs labeled "VCLOCK". In the illustrated embodiment, the frequency of VCLOCK is set at 375 KHz.

As explained hereinafter, the HEAD SYNC generator 164 establishes the leading edge and trailing edge of the HEAD SYNC pulse. As explained above, when HEAD SYNC is high, the read heads R1, R2 of the helical scan system 20 travel over stripes of the magnetic tape 32. When HEAD SYNC is low, the write heads W1, W2 are over the stripes.

The HEAD SYNC generator 164 has two registers, namely registers 502 and 504, which store system constant values. Register 502 stores a value equivalent to the number of clock pulses required for the drum 36 to travel through half (180 degrees) of its rotation. This value is the pulse width of the constant HEAD SYNC signal generated by the HEAD SYNC generator 164. In the illustrated embodiment, this value is 6144 clock pulses of VCLOCK. Register 504 has stored therein a value equivalent to the number of clock pulses required for a head to travel the remainder of a stripe after generation of a BKRDY signal. As will be seen hereinafter, the BKRDY signal is generated by the pattern detector 143 upon detection of a predetermined number of occurrences of a synchronization field. The value stored in register 504 is thus a constant, known hereafter as the constant "K". In the illustrated embodiment, the value of constant "K" stored in register 504 is 5236 pulses of VCLOCK.

Figure 17:
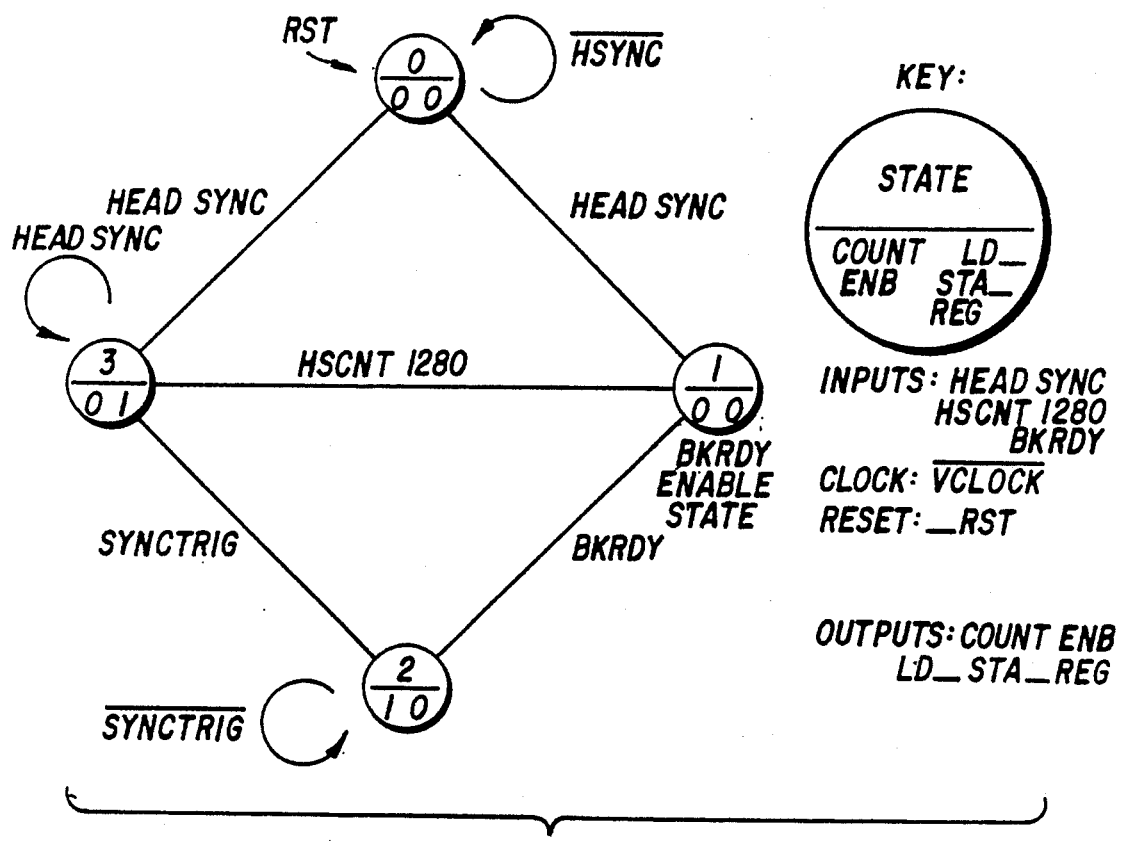
FIG. 17 is a schematic view of a state sequencer included in the helical scan system of the embodiment of FIG. 1.

The HEAD SYNC generator 164 includes a state sequencer machine 506 which is connected to receive the BKRDY signal from the pattern detector 143. The state sequencer 506 is internally configured according to the state diagram of FIG. 17.

The state sequencer 506 determines a certain interval value "A" and is connected to apply the interval value "A" to an enabling up-count pin of counter 508. The state sequencer 506 also generates a signal LO.STA.REG which is applied to a clock input pin of a 13-bit register 510. Data output pins of the up-counter 508 are connected to input data pins of the register 510.

Output pins of the 131-bit register 510 are connected so as to apply, upon receipt of the signal LO.STA.REG, the value "A" stored in register 510 to a computational circuit 512. The computational circuit is also connected to receive as a second input the value of register 504, previously described as containing the constant value "K". The computational circuit 512 is configured simply to take to subtract the value of "A" (as applied by the register 510) from the constant value "K", and to apply the difference "B" on a 13-bit bus to register 514.

The register 514 is connected to apply its contents (the difference "B") to a 13-bit down counter 516. The counter 516 is connected to count down from "B" to zero.

The HEAD SYNC generator 164 also comprises a flip-flop 517. Flip-flop 517 has its set terminal connected to receive the DRUM SYNC signal. As mentioned before, the DRUM SYNC signal is generated by the unillustrated tachometer mounted on the motor shaft of drum 36, so that the DRUM SYNC signal is generated once per rotation of the drum 36. Upon receiving the DRUM SYNC signal, the SYNC TRIG output signal of the flip-flop 517 goes high. The reset pin of the flip-flop 517 is connected to the down counter 516. When down counter 516 reaches zero, the flip-flop is reset so that its SYNC TRIG output signal goes low.

The SYNC TRIG signal generated by the flip-flop 517 is applied to the reset pin of a flip-flop 518. When reset, the HEAD SYNC output signal of flip-flop 518 goes low. The resetting of flip-flop 518 establishes the trailing edge of the HEAD SYNC signal.

The SYNC TRIG signal generated by the flip-flop 517 is also applied to the state sequencer 506 and to another down counter, particularly down counter 519. The down counter 519 is connected to receive the contents of register 502. Upon receipt of a low-going SYNC TRIG signal from the flip-flop 517, the down counter 519 counts down from the value contained in register 502 (i.e., 6144 pulses) to zero. Upon counting down to zero, the down counter 519 sets flip-flop 518. Setting flip-flop 518 causes the output of flip-flop 518 (i.e., the HEAD SYNC signal) to go high. Setting the flip-flop 518 thus establishes the leading edge of the HEAD SYNC signal.

The HEAD SYNC signal is applied to the state sequencer 506 as one of the inputs to the state sequencer 506. Further, the HEAD SYNC signal is applied to two counters, counters 520 and 521. Counter 520 generates a high output to AND gate 522 upon receiving $2^{10}$ (2048)VCLOCK pulses after HEAD SYNC goes high; counter 521 generates a high output to AND gate 522 upon receiving $2^8$ (5121) VCLOCK pulses after HEAD SYNC goes high. The state sequencer 506 has an input pin connected to AND gate 522, which receives a true signal during a time between 512 and 2048 VCLOCK pulses after HEAD SYNC goes high.

STRUCTURE: SERVO TRACKING

As mentioned above, the helical scan system 30 has servo head S (see FIG. 1) which follows Track 1 in the manner generally shown in FIG. 6. In following Track 1, the servo head S reads servo areas ST0, ST1, and ST2 provided on two adjacent tracks (Track 2). The servo tone areas ST1, ST2, and ST3 are the areas where the 1.42 MHz signal is recorded.

In the above regard, in following Track 1, the servo head S first encounters the first servo tone areas ST0 on Tracks 2; near the middle of Track 1 the servo head encounters tone servo areas ST1 on Tracks 2; near the end of Track 1 the servo head encounters servo tone areas ST2 on Tracks 2.

Figure 8:
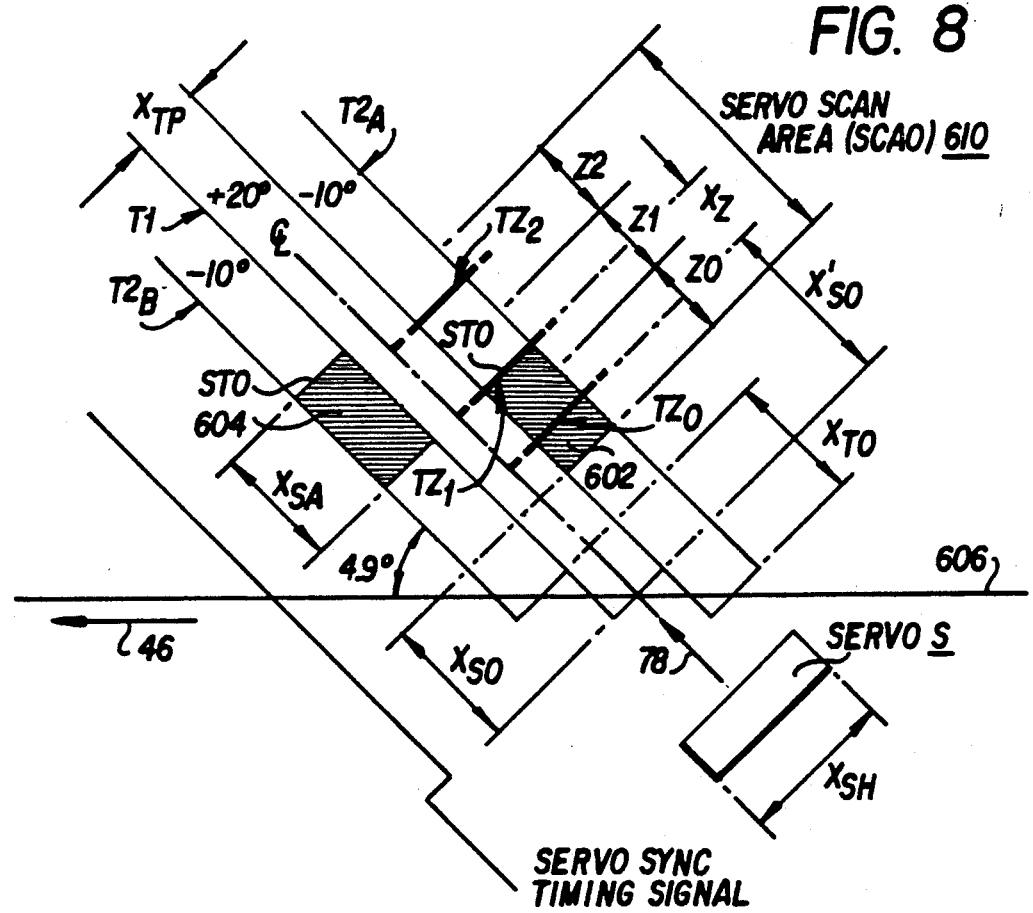
FIG. 8 is a schematic view showing the on-track path of a servo head of the helical scan system of the embodiment of FIG. 1.

FIG. 8 shows a servo scan area 610, also known as SCA0, which extends in the direction of head travel (indicated by arrow 78) for a distance equal to the length of two servo tone areas ST0, i.e. 0.710 millimeters. The servo scan area 610 is conceptualized as being equally partitioned into three servo scan subzones, namely sub-zones $Z_0$, $Z_1$, and $Z_2$ Each sub-zone Z extends for a length $X_z$ in the direction of head travel. FIG. 8 also shows points $TZ_0$, $TZ_1$, and $TZ_2$ within the respective sub-zones $Z_0$, $Z_1$, and $Z_2$, which points $TZ_0$, $TZ_1$, and $TZ_2$ correspond to times and distances measured with respect to the reference line 606 along the direction of head travel. As described hereinafter, at the times $TZ_0$, $TZ_1$, and $TZ_2$ the amplitude of the servo tone signal is sampled.

As shown in FIG. 6, a distance $X_A$ exists from the end of servo scan area SCA0 to the beginning of servo scan area SCA1, and a distance $X_B$ exists from the end of servo scan area SCA1 to the beginning of servo scan area SCA2.

Figure 3:
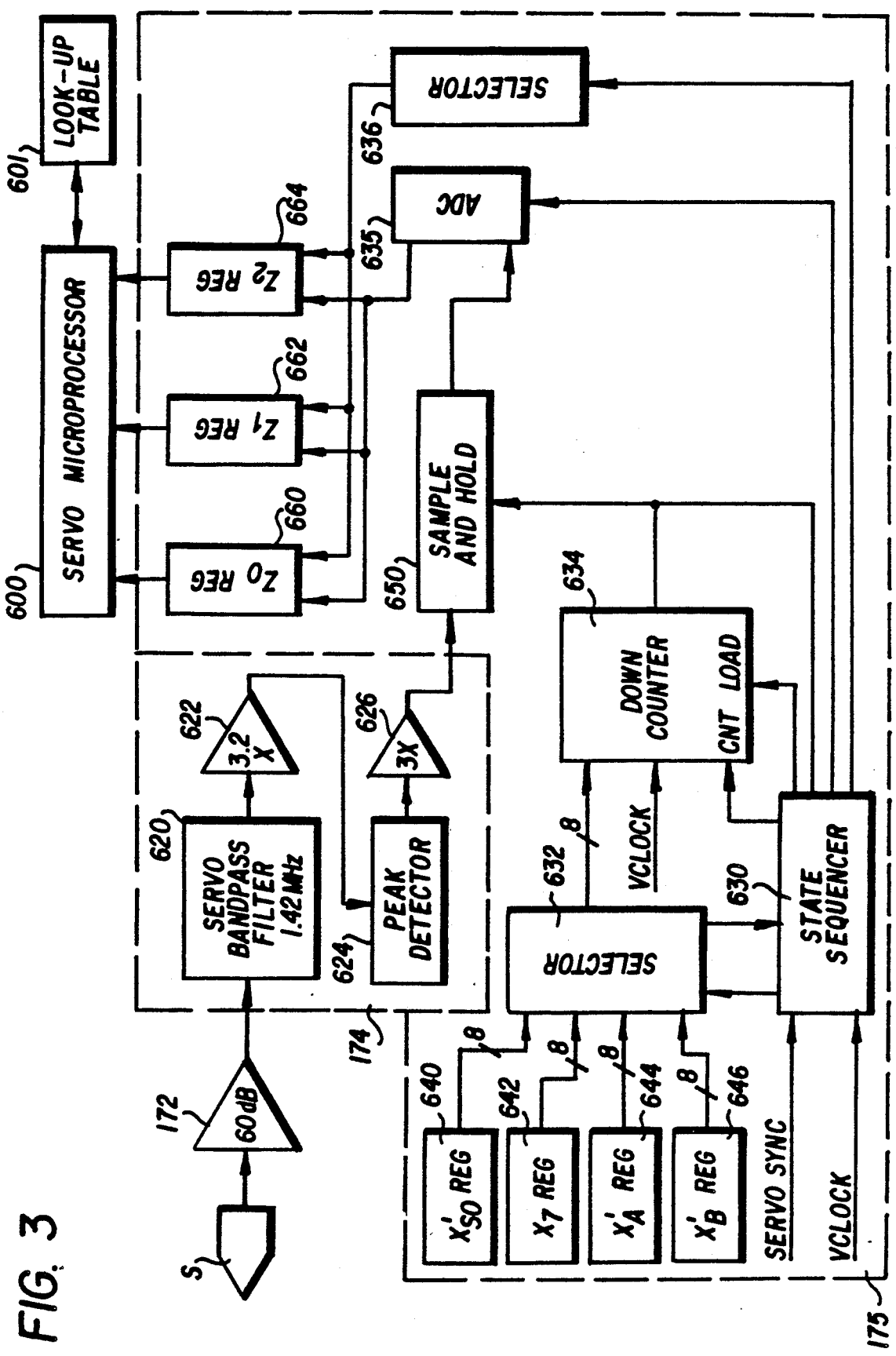
FIG. 3 is a schematic view of a servo tracking circuit, together with the servo head, a filter detection circuit, and a servo microprocessor included in the helical scan system of the embodiment of FIG. 1.

As shown in FIG. 4, servo head S is connected to a servo filter detector circuit 174, which in turn is connected to a servo tracking circuit 175 included in the motion control system 152. FIG. 3 shows the servo tracking circuit 175, together with the servo head S, the filter detector circuit 174, and a servo microprocessor 600 included in the motion control system 152. The servo microprocessor 600 has a memory 601 available thereto for storing a look-up table. Certain elements of the servo tracking circuit 175 are best understood after a further discussion of servo aspects of the tape format.

In the above regard, FIG. 8 shows the path of the servo head S relative to the beginning of Track 1 and Track 2 provided on tape 32. Tape 32 travels in the direction indicated by arrow 46; the servo head S travels in the direction shown by arrow 78 (desirably over the centerline of Track T1). In the embodiment illustrated in FIG. 8, the track angle (with respect to the direction of tape transport) is 4.9 degrees; the track pitch ($X_{TP}$) is 15.5 micrometers; and, the width of servo head S ($X_{SH}$) is 31 micrometers (i.e., twice the track pitch).

FIG. 8 also shows the first servo tone areas ST0 for Track 2, and in particular a first servo tone area 602 for a Track $2_A$ and a first servo tone area 604 for a Track $2_B$. Of course, a Track 1 is provided between the first and second Track 2.

FIG. 8 further shows the position of the servo tone areas ST0 relative to a servo reference line 606. The reference line 606 is conceptualized as running parallel to the direction of tape transport (indicated by arrow 46) and intersecting the centerline of each stripe at the beginning of each stripe. Along the direction of travel of the servo head S, the beginning of each servo area ST0 on Track 2 is displaced a constant and known distance $X_{so}$ from a point on the reference line 606 crossed by the center of the servo head S when the servo head S is aligned exactly between adjacent stripes (between Tracks $T2_A$ and $T2_B$). In addition, FIG. 8 shows that each servo tone area ST0 extends a length $X_{SA}$ in the direction of head travel (indicated by arrow 78). In the illustrated embodiment, $X_{SA}$ is 0.355 millimeters.

Returning now to FIG. 3, the servo head S is connected to the amplifier 172, which in turn is connected to the filter and detection circuit 174. As shown in FIG. 3, the filter and detection circuit 174 includes a servo bandpass filter (1.42 MHz) 620; an amplifier 622; a peak detector 624; and, a further amplifier 626, all connected in seriatim in the order just described.

The servo tracking circuit 175 shown in FIG. 3 includes a state sequencer 630 which sequences the operation of the circuit 175. State sequencer 630 is connected to receive VCLOCK pulses and to receive a SERVO SYNC signal (hereinafter described). The state sequencer 630 functions to issue sequencing commands to other components of the servo tracking circuit 175, including an input register selector 632; a down counter 634; an analog-to-digital converter (ADC) 635; and, a conversion register selector 636.

The input register selector 632 is connected to receive multiplexed input signals from input registers 640, 642, 644, and 646. Input register 640 has stored therein the a number of VCLOCK pulses required for an on-track servo head S to travel the length $X'_{so}$. The length $X'_{so}$ is the distance from the reference line (along the direction of head travel) to the point $TZ_O$ at which a first amplitude sample is taken, assuming the servo head S to be perfectly on-track. In this regard, Input register 642 has stored therein a number of VCLOCK pulses required for a servo head S to travel between points TZ, i.e., to travel from point $TZ_0$ to point $TZ_1$, which number is a constant for all points TZ within a servo scan area 610. Input register 644 has stored therein a number of VCLOCK pulses required for the servo head S to travel the distance $X'_A$ (i.e., the distance from point $TZ_2$ of first servo scan area SCA0 to the point $TZ_0$ in the second servo scan area SCA1). Input register 646 has stored therein a number of VCLOCK pulses required for the servo head S to travel the distance $X'_B$ (i.e., the distance from point $TZ_2$ of the second servo scan area SCA1 to the point $TZ_0$ in the third servo scan area SCA2).

The input register selector 632 is connected to apply a value multiplexed from one of the registers 640, 642, 644, or 646 to the down counter 634. The down counter 634 is connected to apply a signal to a sample and hold circuit 650 when the count in down counter 634 reaches zero.

The sample and hold circuit 650 is also connected to receive the amplified peak signal from the servo head S as developed by the filter and detector circuit 174. The sample and hold circuit 650 is connected to apply the sample signal held therein to the analog-to-digital converter 635. The analog-to-digital converter 635 is connected to apply its converted of a plurality of amplitude registers, namely $Z_0$ amplitude register 660; $Z_1$ amplitude register 662; and $Z_2$ amplitude register 664. The amplitude registers 660, 662, and 664 are connected to have their respective contents made available to the servo microprocessor 600.

OPERATION: HEAD SYNC GENERATION

As was mentioned above, the purpose of the HEAD SYNC generator 164 is to establish the timing of the leading and trailing edges of the HEAD SYNC signal. As will be recalled from the preceding discussion, the HEAD SYNC signal is high when the read heads R1, R2 are traveling over a stripe on tape 32. Conversely, the HEAD SYNC signal is low when the write heads W1, W2 are traveling over a stripe on tape 32. The HEAD SYNC signal is used, not only by the write and read circuits connected to the write heads W1, W2 and read heads R1, R2, but also by the formatter/encoder 108 and the decoder/deformatter 110 for properly sequencing their operations.

Figure 19:
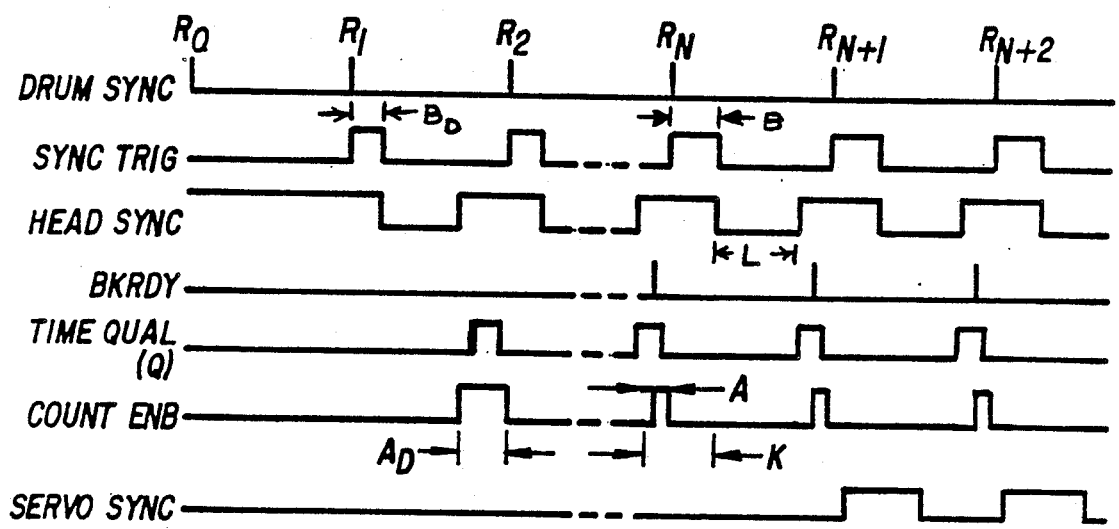
FIG. 19 is a timing diagram showing signals involved in a method of determining edges of a HEAD SYNC signal utilized by the helical scan system of the embodiment of FIG. 1.
Figure 18:
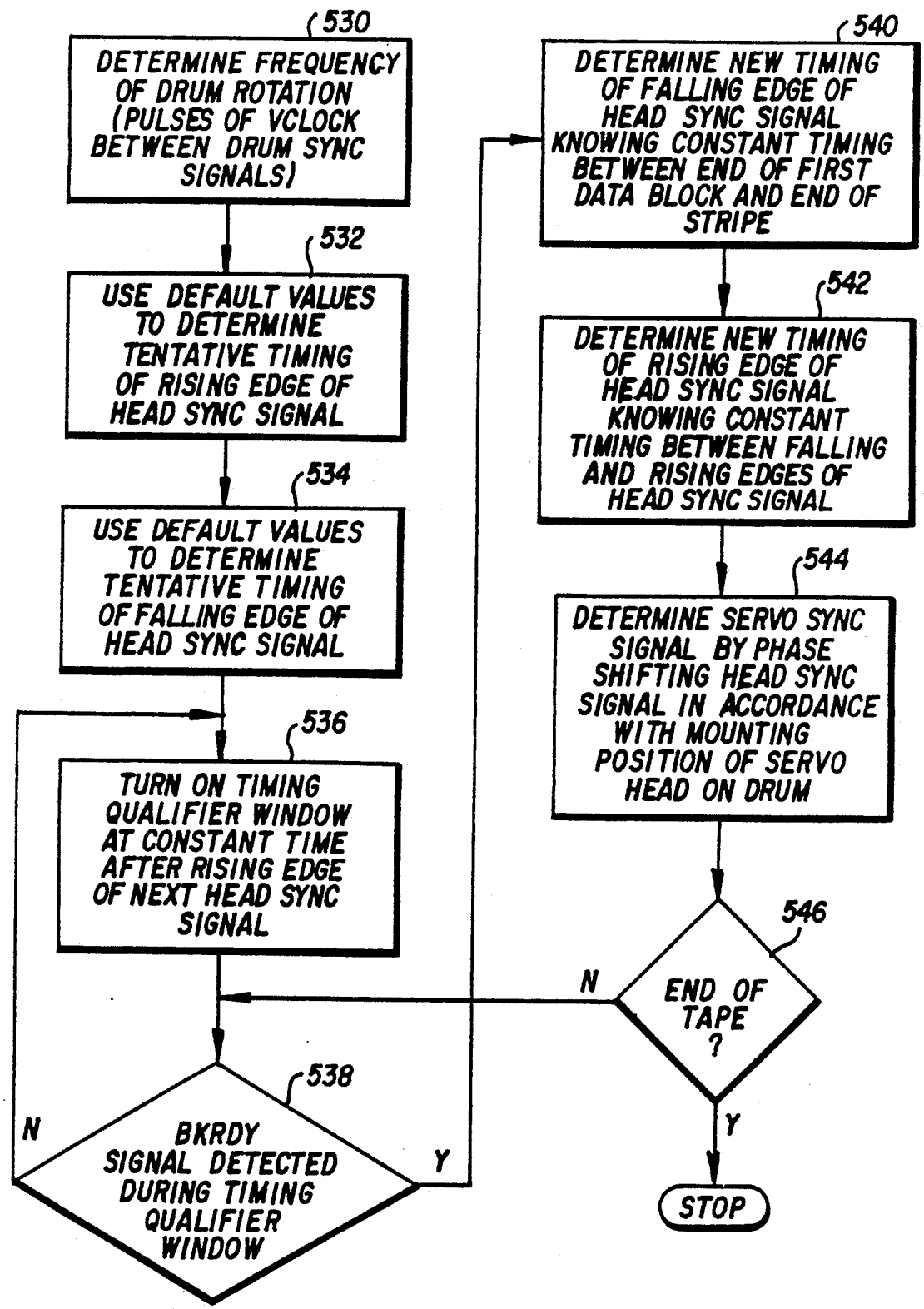
FIG. 18 is a schematic view showing steps implemented in determining edges of a HEAD SYNC signal utilized by the helical scan system of the embodiment of FIG. 1.

A method of obtaining the edges of the HEAD SYNC signal is understood with reference to FIG. 18 and FIG. 19. FIG. 13 is a logic diagram showing steps involved in the method of obtaining HEAD SYNC edges; FIG. 19 is a timing diagram showing values of pertinent signals utilized in the HEAD SYNC determination method, including the HEAD SYNC signal itself.

At the beginning of the process, the tape 32 is transported past the drum 36 and the drum 36 begins to rotate. As the drum 36 rotates, the drum tachometer generates the DRUM SYNC signal once per rotation. Assuming that the drum 36 reaches nominal rotational speed upon rotation $R_0$, a sequence of DRUM SYNC pulses $R_0$, $R_1$, $R_2$, etc. are shown in FIG. 19. Then, as shown as step 530 in FIG. 18, the number of VCLOCK pulses occurring between DRUM SYNC pulses is determined.

Upon start up, the tape 32 is transported past the drum 36 at a speed that is not the nominal transport speed for read/write operations. In the illustrated embodiment, wherein the nominal tape speed is 11.079 mm/sec, the tape is transported at a speed that is 10% greater than nominal speed.

Upon start-up, with the tape 32 being transported at a speed exceeding nominal speed, the read heads R1, R2 travel over an introductory portion of the tape 32 wherein the group 370 of LBOT stripes are stored (see FIG. 5). However, during start-up, only read head R1 is permitted to read the tape. As mentioned above, the group 370 includes 320 helical stripes. Odd numbered stripes of the group 370 were recorded by write head W1 to have the format of Track 1 as described above. Even numbered stripes of the group 370 were recorded by write head W2 to have the format of Track 2 as also described above.

Upon start up, certain default values are imposed on the HEAD SYNC generator 164 of FIG. 13. In this respect, the interval "A" is assigned a default value (AD) of 2986 VCLOCK pulses by pre-loading that value into the register 510 and the value "B" is assigned as default value ($B_D$) of 2250 VCLOCK pulses by pre-loading that value into the register 514. These default values are utilized to determine a default falling edge of HEAD SYNC, as represented by step 534 in FIG. 18 and as described immediately below.

For determining the default falling or trailing edge of HEAD SYNC, upon the detection of a DRUM SYNC signal (at rotation $R_1$) the default value $B_D$ is loaded from register 514 into the down counter 516, and the down counter 516 counts down to zero. While the down counter 516 counts down, its SYNC TRIG output signal is high. When the down counter 516 reaches a zero count, its SYNC TRIG output signal goes low.

A low-going SYNC TRIG output resets the flip-flop 517, so that the HEAD SYNC output signal of flip-flop 517 goes low, thereby establishing a default trailing edge of the HEAD SYNC signal (see step 534 of FIG. 18).

The HEAD SYNC signal stays low between rotation $R_1$ and rotation $R_2$ until the flip-flop 517 is set. In this respect, the flip-flop 517 is set exactly 6144 VCLOCK pulses later. This is the number of VCLOCK pulses "L" (loaded from register 502) down from which the counter 518 counts to zero. Upon reaching zero, the down counter 518 sets the flip-flop 517, thus establishing a default leading or rising edge of the HEAD SYNC signal.

As the read head R1, R2 over the group 370 of LBOT stripes stored on tape 32, the super-nominal transport speed of the tape 32 precludes the heads R1, R2 from following the Track 1 and Track 2, respectively. Instead, the relative tape/drum speed causes the read heads R1 and R2 travel in a skewed manner, so that the heads R1 and R2 pass over only a fraction of the length of a track (see FIG. 20).

Both Track 1 and Track 2 stripes of the group 370 have eight physical blocks 317 provided thereon. As shown in FIG. 14 each physical block 317 has a header 350; a data area 317; an ECC area 354; and, a CRC area 356. As will be shown below, despite the super-nominal transport speed of the tape 32 and the resulting skewed orientation of the heads R1, R2 with respect to Track 1 and Track 2, respectively, read head R1 (the only read head enabled during start-up) is ultimately able to read digital information in a data area 352 of a physical block and to recognize the digital information as being in a data area. Only read head R1 is enabled during start-up, since only read head R1 is connected to the pattern detector 143 to apply signals thereto essentially in real time (as opposed to going through the FIFO 138).

Figure 20:
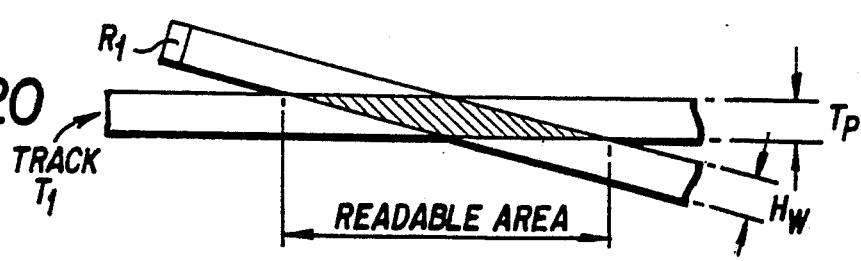
FIG. 20 is a schematic view showing a skewed orientation of a read head of the helical scan system of the embodiment of FIG. 1.

To understand how data area 352 of a physical data block 317 is recognized, consider the skewed path traveled by read head R1 in FIG. 20. The read head R1, having a width denoted by $H_W$, crosses over Track 1 (which has a pitch $T_P$). In crossing over Track 1, head R1 can read a portion of the track, the "readable area", having a length represented by a fraction having the quantity $[3T_P - H_W]$ as its numerator and the tangent of an angle difference as its denominator. In this respect, the denominator is the tangent of the angular difference between the angle of the head at the super-nominal transport speed and the track angle.

Given the foregoing geometry and the format of the tracks, the data area 352 of a physical data block is sufficiently short relative to the readable area determined above to be recognized. But in order to determine how the pattern detector 143 knows when an entire data area 352 has been encountered, the format of the data area 352 must be considered.

FIG. 15 shows that the data area 352 is formatted into forty-eight (48) physical data sub-blocks $386_1$–$386_{48}$. Each physical data block 386 contains the bit synchronization field 387; the information segment number 388; and, the information segment field 389. The bit synchronization field 387 is a unique finite-length sequence or pattern which can be identified by the pattern detector 143. In the preferred embodiment, a 20 bit sequence is utilized with the sequence being 01111111111111111110. The information segment number 387 which follows each bit synchronization field 386 is a 10-bit RLL sequence that provides a segment identifier for information in the information segment field (ISF) 389 that follows. The information segment field has 30 bytes of 10 bits of information each. There are 48 unique information segment numbers 388, which correspond to the 48 data sub-blocks 386 in each physical data block 317.

In order to recognize a physical data block 317, and in particular a data area 352 in a physical data block 317, the pattern detector 143 is configured with comparator and sequencer circuitry to detect the synchronization field ("BSF", which has the value 01111111111111111110) and the forty eight RLL information segment numbers ("ISN"). In this respect, in monitoring in the stream of bits obtained from the read head R1, the pattern detector 143 looks for the first occurrence of the BSF and, upon detecting the same, looks for the first ISN. Exactly thirty bytes later, the pattern detector 143 looks for the second occurrence of the BSF and the second ISN. Similarly, another thirty bytes later the pattern detector 143 expects to see a third occurrence of the BSF and the third ISN. The pattern detector 143 operates in this manner for 48 iterations corresponding to the 48 sub-blocks expected in a physical data block 317. Only after the detection of 48 BSFs with respective ISNs, and the proper 30 byte spacing between each BSF occurrence, will the pattern detector 143 generate the BKRDY signal which indicates that a physical data block is ready.

However, the HEAD SYNC generator 164 ignores BKRDY signals generated for any physical data block 317 except the first physical data block recorded on a stripe. This is because the HEAD SYNC generator 164 knows the physical distance between the first physical data block 137 on a stripe and the end of the stripe.

In order to "filter" or "qualify" only BKRDY signals generated with respect to a first physical data block on a stripe, a timing qualifier window signal TIME QUAL (also known as "Q") is generated. In this respect, the timing of the TIME QUAL signal is related to the timing of the leading or rising edge of the HEAD SYNC signal. As described below and as represented by step 536 in FIG. 18, the TIME QUAL signal is generated to go high at 512 VCLOCK pulses after HEAD SYNC goes high, and to go low at 2048 VCLOCK pulses after HEAD SYNC goes high.

The edges of the TIME QUAL signal are generated by the counters 520 and 521 operating in conjunction with the AND gate 522. In this regard, upon receipt of the high-going HEAD SYNC pulse, both counters 520 and 521 begin to count VCLOCK pulses. The counters 520 and 521 are configured so that AND gate 522 produces a high TIME QUAL signal (also known as the HSCNT 1280 signal) for application to the state sequencer 506 between 512 and 2048 pulses of VCLOCK as counted by the counters 520 and 521. Since the format of each stripe is precisely known, generation of a first BKRDY signal for a first physical data block 317 on the stripe should occur within the TIME QUAL window after the leading edge of the HEAD SYNC signal.

As shown at step 538 in FIG. 18, the HEAD SYNC generator 164 looks for receipt of a BKRDY signal during the TIME QUAL window. Assuming that no BKRDY signal is received by the HEAD SYNC generator 164 during drum rotation $R_1$ of FIG. 19, the HEAD SYNC generator 164 continues to operate with default values (as indicated in FIG. 18 by the return to step 536). The further operation of the remainder of the HEAD SYNC generator 164 using default values is not described in detail herein, such operation being understood by analogy from the ensuing discussion wherein actual values are utilized.

FIG. 19 shows that the pattern detector 143 recognizes a first physical data block 317 on a stripe just before rotation $R_N$ of the drum 36 while the window TIME QUAL is high. At this point, a BKRDY signal is received by the HEAD SYNC generator 164 and the loop of steps 536 and 538 of FIG. 18 is terminated.

Upon receiving the BKRDY signal, the HEAD SYNC generator 164 knows the amount of time required for the head to traverse the remainder of the stripe. In particular, the time required to traverse the remainder of the stripe is stored in register 504 as constant "K". Constant "K" has a value of 5236 VCLOCK pulses, which is easily determined knowing the nominal head/tape speed and the format of the stripe.

Although knowing the amount of time required for the head to traverse the remainder of the stripe, knowledge of the constant "K" alone is not sufficient to precisely establishing the trailing edge of the HEAD SYNC signal. Therefore, the state sequencer 506 operates to enable determination of an interval "A" and a count "B" for use in establishing the trailing edge of the HEAD SYNC signal.

In the above regard, to establish a new falling edge of the HEAD SYNC signal, upon receipt of the BKRDY signal the state sequencer 506 generates a COUNT ENB signal until SYNC TRIG goes high. While the COUNT ENG signal is high, the up-counter 508 is enabled to count the number of VCLOCK pulses between the receipt of the BKRDY signal and the high-going edge of the SYNC TRIG signal.

When SYNC TRIG goes high, the state sequencer 506 loads the count of counter 508 into the register 510 by issuing a LO.STA.REG signal. The count of counter 508 is the interval value "A" corresponding to the number of VCLOCK pulses counted from the receipt of the BKRDY signal (i.e., the end of the first physical data block on the stripe) to the DRUM SYNC signal.

When SYNC TRIG goes high, the HEAD SYNC generator 164 knows not only the constant "K" required for the head to traverse the remainder of the stripe, but also how much of that time (interval "A") was expended prior to the DRUM SYNC signal. The HEAD SYNC generator 164 can therefore calculate the time "B" required, after receipt of the DRUM SYNC signal (i.e., after SYNC TRIG goes high) for the head to traverse the remainder of the stripe. In this regard, $B = K - A$. Thus, the HEAD SYNC generator 164 can establish the trailing or falling edge of the HEAD SYNC signal relative tot he DRUM SYNC pulse.

The computational circuit 512 subtracts the interval "A" from the constant "K" to determine "B". The value for "B" is loaded into register 514. The down counter 516 counts down from "B" to zero. Upon reaching zero, the down counter 516 resets the flip-flop 517, thereby causing TRIG SYNC to go low. The low-going TRIG SYNC signal in turn resets flip-flop 518, causing HEAD SYNC to also go low. Thus, completing the operation signified by step 540 of FIG. 18, the trailing edge of HEAD SYNC is precisely established.

As indicated by step 542, with the trailing edge of HEAD SYNC precisely established with reference to the DRUM SYNC signal, the leading or rising edge of HEAD SYNC is easily established. In this respect, the pulse width of HEAD SYNC, as known constant "L" equal to the number of VCLOCK pulses (6144) for the drum 36 to rotate 180 degrees, is stored in register 502. When TRIG SYNC and HEAD SYNC go low, the low-going TRIG SYNC signal causes the down counter 519 to start counting down the 6144 VCLOCK pulses required for the drum 36 to rotate 180 degrees. When the down counter 519 reaches zero, the down counter 519 sets the flip-flop 518. Setting of flip-flop 518 causes HEAD SYNC to go high, meaning that the leading or rising edge of HEAD SYNC is established.

Precise location of the rising and falling edges of HEAD SYNC enable the helical scan system 30 to know exactly when write heads W1, W2 and read heads R1, R2 are over a stripe. As explained before, when HEAD SYNC is high, the read heads R1, R2 are over their respective stripes T1, T2 (i.e., are in a portion of the path of drum periphery travel that contacts the tape 32). Conversely, when HEAD SYNC is low, the write heads W1, W2 are over their respective strips T1, T2.

The HEAD SYNC signal also enables the helical scan system 30 to know when the servo head S is over track T2 (step 544). As shown in FIG. 1, the servo head S is mounted on the drum 36 at an angular displacement of 90 degrees from the read heads R1, R2. This means that the servo head S traverses Track T2 90 degrees after read head R2 traverses Track T2. Accordingly, FIG. 19 shows a SERVO SYNC signal having the same pulse width as the HEAD SYNC signal, but being phase shifted by 90 degrees with respect to HEAD SYNC. That is, the leading edge of the SERVO SYNC signal occurs 90 degrees after the leading edge of the HEAD SYNC signal, and the trailing edge of the SERVO SYNC signal occurs 90 degrees after the trailing edge of the HEAD SYNC signal.

Once the edges of the HEAD SYNC signal are established in according with the foregoing, the transport speed of the tape 32 can be reduced to nominal so that the read heads R1, R2 can begin to read all subsequent stripes in their entirety. With the edges of the HEAD SYNC signal precisely established, the helical scan system knows exactly when the read heads R1, R2 begin to traverse their respective tracks T1, T2 and when the read heads R1, R2 finish traversing their respective tracks during a rotation of the drum 36.

For each rotation of the drum 36 and until the heads encounter End of Data records (step 546), the HEAD SYNC generator 164 re-establishes the leading and trailing edges of the HEAD SYNC signal. In this respect, for each rotation of the drum 36 the steps 538 through 546 of FIG. 18 are executed so that the most recent receipt of a first BKRDY signal per stripe can be used to update the locations of the edges of the HEAD SYNC signal.

Thus, the HEAD SYNC signal is obtained by reading data provided in physical data blocks 317 recorded on helical stripes. The helical scan system 30 of the invention reads digital data before establishing its timing signals, rather than first establishing timing signals through the use of special synchronization bursts and then using the timing signals to lock on to data.

OPERATION: SERVO TRACKING

The servo head S endeavors to travel over the centerline of Track 1, and for this purpose detects the servo tone areas ST0, ST1, and ST2 provided on the two adjacent tracks T2. That is, as shown in FIG. 8, the servo head S attempts to follow the +20 degree azimuthal track T1, and does so by reading the servo tone areas provided on the two tracks T2 of azimuthal −10 degrees which border the track T1. As is understood considering the counterclockwise direction of rotation of the drum 36 upon which the servo head S is mounted (see FIG. 1), the servo head S follows the read heads R1, R2 by about 90 degrees of drum rotation.

The time at which the read heads R1, R2 cross the beginnings of respective tracks TI, T2 is precisely known with reference to the HEAD SYNC signal As will be recalled, the HEAD SYNC signal is provided by the HEAD SYNC generator 164 included in the motion control system 152. The generation of the HEAD SYNC signal is understood from simultaneously-filed U.S. patent application Ser. No. 07/434,008 entitled METHOD AND APPARATUS FOR SYNCHRONIZING TIMING SIGNALS FOR HELICAL SCAN RECORDER, which is incorporated herein by reference. For the present discussion, it is sufficient to know that the HEAD SYNC signal goes high when the read heads R1, R2 begin to travel the tracks T1, T2, respectively.

FIG. 9 shows the HEAD SYNC signal and a SERVO SYNC signal derived therefrom. The SERVO SYNC signal reflects the time at which reference line 606 is crossed by the center of the servo head S. The rising or leading edge of the SERVO SYNC signal is precisely determined knowing the time at which the HEAD SYNC signal goes high. In this regard, the servo head S is located 90 degrees about the drum 36 from the read heads R1, R2. Accordingly, in the illustrated embodiment, the leading edge of the SERVO SYNC signal is phase-shifted 90 degrees after the leading edge of the HEAD SYNC signal.

The SERVO SYNC signal goes high as the servo head S crosses the reference line 606. The state sequencer 630 receives the high-going SERVO SYNC signal and uses that signal as a reference point to sequence operations of the servo tracking circuit 175 relative to subsequent pulses of VCLOCK. The sequence of operations directed by the state sequencer 630 is understood with reference to FIG. 9.

When the rising edge of SERVO SYNC is received by the state sequencer 306, the sequencer 306 directs the selector 632 to multiplex the contents of $X'_{so}$ register 640 to the down counter 634. The down counter 634 then counts down the number of VCLOCK pulses required for the servo head S to travel the distance $X'_{so}$.

When the down counter 634 reaches zero, and assuming a perfect on-track positioning, the servo head S should be in the servo sub-zone $Z_0$ and at the sample instant $TZ_0$. Upon reaching zero, the down counter 634 signals the sample and hold circuit 650 to sample and hold the peak amplitude of the signal received from servo head S at that instant (time $TZ_0$), which should be the amplitude of the servo signal when servo head S is over the servo sub-zone $Z_0$.

At time $TZ_0$ the down counter 634 also informs the state sequencer 606 that it has reached zero after counting down from $X'_{so}$. At that point, the state sequencer 606 issues two commands. First, the state sequencer 606 enables the ADC 635 to convert the contents of the sample and hold circuit 650 to a digital value. Second, the state sequencer directs the selector 632 to multiplex the contents of $X_z$ register 644 into the down counter 634.

The ADC converts the amplitude of the servo signal received for time $TZ_0$ into a digital value. The state sequencer 606, operating through the selector 636, causes that $Z_0$ digital amplitude value to be stored in $Z_0$ amplitude register 660.

The contents of $X_z$ register 644 was put into the down counter 634 to time the passage of the servo head S from each sampling point TZ. The time $TZ_1$ is reached when down counter 634 has counted down to zero from the contents of $X_z$ register 644. At time $TZ_1$ the state sequencer 606 knows that the servo head S should be in the servo sub-zone $Z_1$ at point $TZ_1$. In like manner with the foregoing description for time $TZ_0$, at time $TZ_1$ the amplitude of the servo signal is sampled and converted to a $Z_1$ digital amplitude value. The $Z_1$ digital amplitude value is then stored in $Z_1$ amplitude register 662.

The down counter 634 also notifies the state sequencer when it has again reached zero, meaning that the servo head S should have travelled the additional distance $X_z$ to point $TZ_2$. At this point the state sequencer 606 knows that the servo head S, if on-track, should be at point $TZ_2$ in sub-zone $Z_2$. In like manner as with the preceding servo sub-zones $Z_0$ and $Z_1$, at time $TZ_z$ the servo tracking circuit 175, under the direction of the state sequencer 606, samples the amplitude of the analog servo signal at time $TZ_2$, converts that amplitude into a digital value, and stores the $Z_2$ digital amplitude value into $Z_2$ amplitude register 664.

With the $Z_0$, $Z_1$, and $Z_2$ digital amplitude values available to the servo microprocessor 600 in the respective amplitude registers 660, 662, and 664, the microprocessor 600 evaluates those three values to determine whether servo correction is required and, if so, to what extent. A discussion of the evaluation procedure of the servo microprocessor 600 is provided further below, but for the present the continued travel of the servo head S is described.

When the down counter 634 has again counted down the length $X_2$ to point $TZ_2$, the state sequencer 606 is so notified. Having directed the sampling of amplitudes for the times $TZ_0$, $TZ_1$, and $TZ_2$ included in the first servo scan area SCA0, the state sequencer 606 anticipates the travel of the servo head S to the second servo scan area SCA1 near the middle of Track 2.

In the above regard, the state sequencer 606 directs the selector 623 to multiplex the contents of $X'_A$ register 644 into the down counter 634. The contents of $X'_A$ register 644 corresponds to the number of VCLOCK pulses required for the servo head S to travel from the point $TZ_2$ of servo scan area SCA0 to point $TZ_0$ in the second servo scan area SCA1. When the down counter 634 reaches zero from this number, the state sequencer 606 realizes that it is time to sample the amplitude of the servo signal for servo sub-zone $Z_0$ for the second servo scan area SCA1 at time $TZ_0$ for area SCA1. This is accomplished essentially in the manner described above with reference to servo scan area SCA1, as are the successive samplings, conversions, and storing of the servo amplitudes at times $TZ_1$ and $TZ_2$ for sub-zones $Z_1$ and $Z_2$ of servo scan area SCA1. Then, the servo microprocessor 606 uses the new digital amplitude values for times $TZ_0$, $TZ_1$, and $TZ_2$ of servo scan area SCA1 to re-evaluate the servo positioning.

After deriving amplitude signals for servo scan area SCA1, the servo tracking circuit 175 essentially repeats the procedure for the last servo scan area on Track 2, i.e., servo scan area SCA2. In this regard, after the amplitude signals for servo scan area SCA1 are obtained, the state sequencer 606 directs the selector 632 to multiplex the contents of $X'_s$ register 644 into the down counter 634. Expiration of the $X'_s$ count (i.e., reaching zero) indicates that the servo head S should be in the first sub-zone (i.e., sub-zone $Z_0$ of the servo scan area SCA2), and at point $TZ_0$ therein in particular. Amplitude signals for the times $TZ_0$, $TZ_1$, and $TZ_z$ of servo scan area SCA2 are obtained in the manner of the preceding servo areas, so that the servo microprocessor 600 can obtain from the amplitude registers 660, 662, and 664 the digital values needed for its servo adjustment evaluation.

As mentioned above, the servo microprocessor 600 evaluates the contents of the amplitude registers 660, 662, and 664, i.e., the amplitudes of the servo signals at times $TZ_0$, $TZ_1$, and $TZ_2$, respectively, to determine whether adjustment of the servo mechanism is required to obtain a precise on-track position. When the servo head S is following directly over the centerline of Track 1, i.e. exactly half way between the adjacent tracks $T2_A$ and $T2_B$, the amplitudes of the $Z_0$, $Z_1$, and $Z_2$ signals are all equal.

If the servo head S is off-track by ½ of the track pitch or less, the servo microprocessor 600 can determine the direction in which the servo head should be repositioned merely by comparing the amplitudes of the servo signals read from the stripes $T2_A$ and $T2_B$. The microprocessor 600 can make this adjustment since the relationship between the amplitude difference and the degree of correction required is linear so long as the servo head S is off-track by ½ of the track pitch or less.

Figure 10:
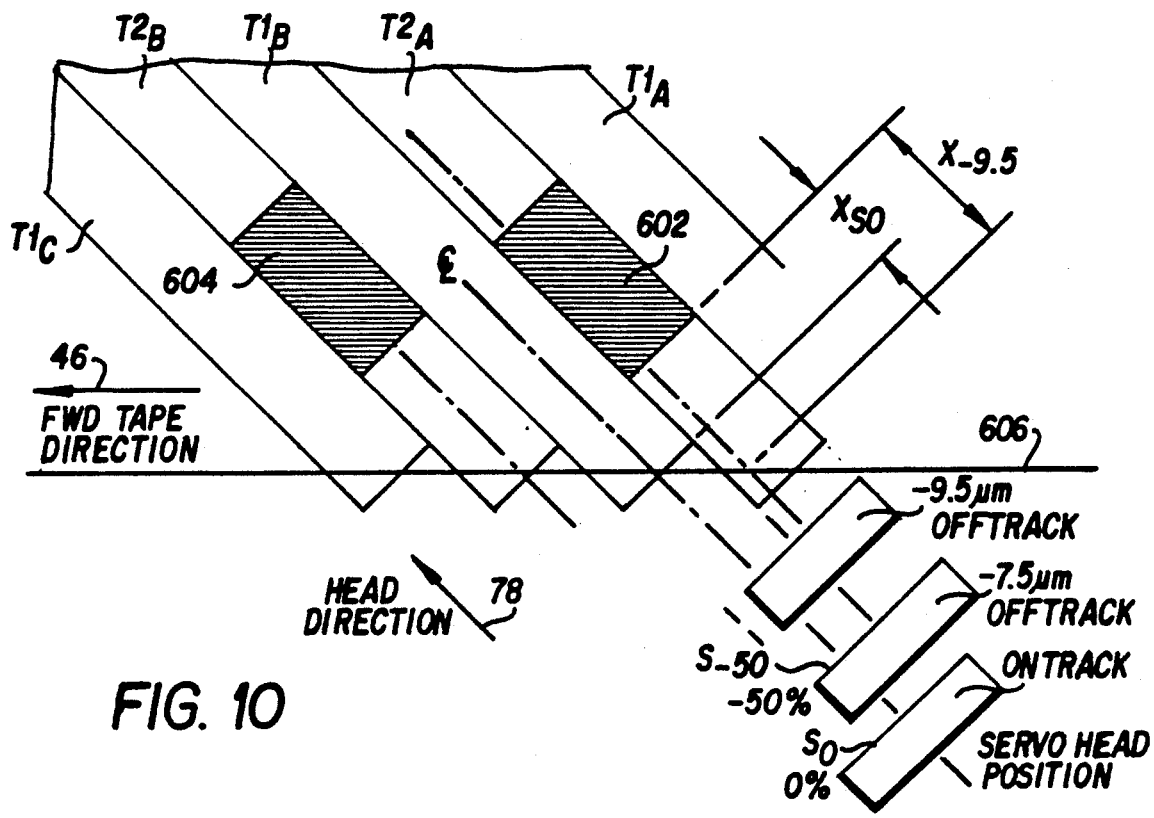
FIG. 10 is a schematic view showing various off-track paths of a servo head of the helical scan system of the embodiment of FIG. 1.

An example of the foregoing occurs for servo head $S_{-50}$ shown in FIG. 10. Servo head $S_{-50}$ is 50% off-track, being ½ pitch too far to the right (i.e., in a negative direction) as shown in FIG. 10. Given the linear relationship in this range, the microprocessor 600 can readily determine that the servo head $S_{-50}$ should be moved to the left by comparing the magnitudes of the amplitude signals. Moreover, the microprocessor 600 can easily determine the degree to which the servo head S should be moved to the left, since the distance which the servo head S need be moved is linearly related to the difference of the amplitudes of the servo signals.

Figure 11:
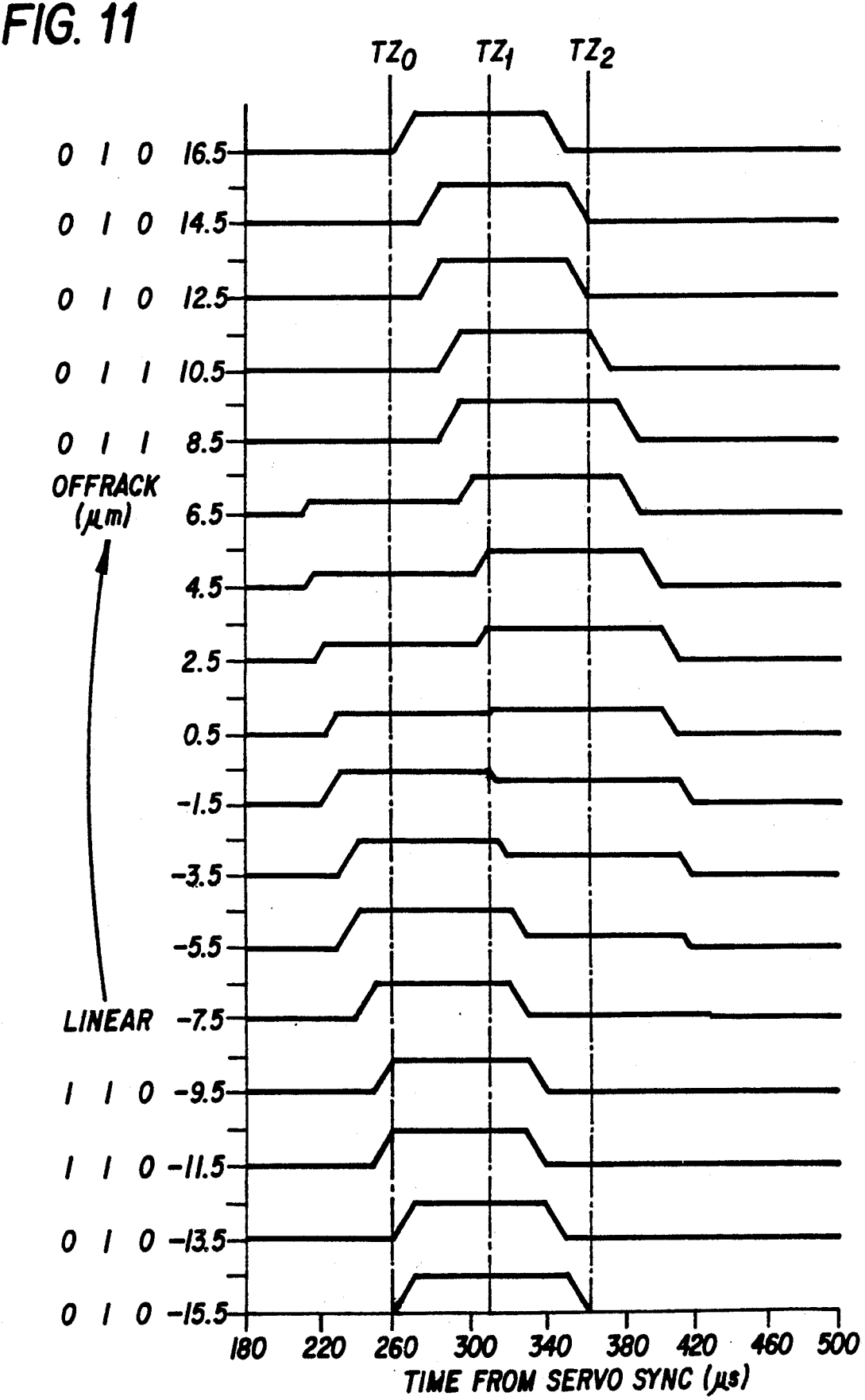
FIG. 11 is a diagrammatic view of amplitude waveforms for a range, of off-track servo head positions for the helical scan system of the embodiment of FIG. 1.

The amplitude waveforms for a range of off-track servo head positions are shown in FIG. 11. The horizontal axis of FIG. 11 represents microseconds after the leading edge of the SERVO SYNC signal. The vertical axis of FIG. 11 represents the degree (in micrometers) to which the servo head is off-track. As mentioned before, when the servo head S is off-track by ½ track pitch or less, the amount of positional adjustment required (in micrometers) is in a linear relationship with the difference of the servo signal amplitudes. In this linear region, equalization of the amplitudes from two tracks achieves the desired on-track condition. This linear region is shown from about −7.5 to about +7.5 micrometers in FIG. 11.

In the above regard, for a host of servo tracking conditions FIG. 11 shows the digitized amplitude of the servo signal subsequent to the rising edge of the SERVO SYNC signal. By comparing the magnitude of the amplitudes at the times $Z_0$, $Z_1$, and $Z_2$, the servo microprocessor 600 can determine the fact, direction, and extent of servo misalignment. The vertical axis of FIG. 11 shows the extent to which the servo head S is off track. When the amplitude of the servo signal is essentially the same at times $Z_0$, $Z_1$, and $Z_2$, the servo head S is on track (the center of the vertical axis of FIG. 11). However, when the servo head S becomes off track in a negative direction sense (i.e., to the right of the centerline of Track 1), the amplitude signal of the servo head resembles one of the waveforms shown in the lower portion of FIG. 11. Conversely, when the servo head S becomes off track in a positive direction sense (to the left of the centerline of Track 1), the amplitude signal of the servo head resembles one of the waveforms in the upper portion of FIG. 11.

As an example of the foregoing, assume a servo head $S_{-50}$ approaches the reference line 606 and is off track by 50% in a negative direction sense as shown in FIG. 10. Servo head $S_{-50}$ needs a leftward correction (i.e. a correction in the positive sense) of 7.5 micrometers. At the time SERVO SYNC goes high, and being off track in the negative sense, the servo head $S_{-50}$ will have a distance greater than $X_{50}$ to travel before reaching the servo sub-zones $Z_0$, $Z_1$, and $Z_2$ of the servo scan area SCA0. Thus, as shown by the waveform at the −7.5 micrometer gradation of the vertical axis of FIG. 11, the rising edge of the amplitude waveform for head $S_{-50}$ is shifted to the right. In being off track in the negative sense, when it comes time to sample the servo head amplitude for sub-zone $Z_2$, the amplitude of the signal detected by servo head $S_{-50}$ will be near zero.

For servo head $S_{-50}$, the servo microprocessor 600 obtains amplitude values for times $Z_0$, $Z_1$, and $Z_2$, (approximating 1.0, 1.0, and 0.0, respectively) from the registers 660, 662, and 664. Knowing those amplitude values, the servo microprocessor 600 generates an appropriate signal to the drum servo 156 for moving the heads 7.5 micrometers in the positive sense direction, thereby resulting in better tracking.

In some cases a servo head is off-track by more than ½ pitch. When a servo head is off-track by more than ½ pitch, a servo system unaided by the present invention could not make an efficient and rapid determination of the extent and direction of positional adjustment required for the servo system, since the system is not linear under this condition.

As an example of operation in the non-linear range, assume a servo head $S_{-9.5}$ approaches the reference line 606 and is off track by 9.5 micrometers in a negative direction sense as shown in FIG. 10. Servo head $S_{-9.5}$ needs a leftward correction (i.e. a correction in the negative sense) of 9.5 micrometers. At the time SERVO SYNC goes high, and being off track in the positive sense, the servo head $S_{-9.5}$ will have a distance $X_{-9.5}$ to travel before reaching the servo sub-zones $Z_0$, $Z_1$, and $Z_2$ of the servo scan area SCA0 This distance $X_{-9.5}$ is greater than the distance $X'_{so}$ which the head would otherwise if the servo head were on track. Accordingly, at time $TZ_0$ the servo head $S_{-9.5}$ has fully reached the servo tone area ST0 of track $T1_A$. Therefore, at time $TZ_0$, the servo signal amplitude $Z_0$ for time will full strength amplitude ("1.0"). At time $TZ_1$, the servo had $S_{-9.5}$ will be fully over the servo tone area STO 602, with the result that the servo signal amplitude $Z_1$ at time $TZ_1$ will be full strength ("1.0"). At time $TZ_2$, however, the servo head $S_{-9.5}$ will be even with servo tone area ST0 604 of stripe $T2_B$, but is so far off-track with relation to stripe $T2_B$ that the servo signal of servo tone area ST0 604 cannot be detected. Thus, the amplitude of the signal from the servo head $S_{-9.5}$ at time $TZ_2$ is essentially zero ("0.0").

FIG. 11 shows a graph of the amplitude of the signal from servo head $S_{-9.5}$ as a function of time from the leading edge of signal SERVO SYNC. As indicated above and visible from FIG. 11, servo head $SA_{-9.5}$ has values 0.8, 1.0, and 0.0 for the times $TZ_0$, $TZ_1$, and $TZ_2$, respectively.

FIG. 12 illustrates how the servo microprocessor 600 uses the values for times $TZ_0$, $TZ_1$, and $TZ_2$ to determine the direction by which a servo head is off-track. In this regard, FIG. 12 shows four patterns for the time values $TZ_0$, $TZ_1$, and $TZ_2$. A first pattern of 0.5, 0.5, 0.5 indicates that a servo head is on-track. A second pattern of 0, 1, 1 indicates that a servo head is ahead (i.e., too far to the left as shown in FIG. 10). A third pattern of 1, 1, 0 indicates that a servo head is behind (i.e., too far to the right as shown in FIG. 10). A fourth pattern of 0, 1, 0 indicates that a servo head is off-track by ½ track pitch.

Servo head $S_{-9.5}$ is classified according to the third pattern (i.e., 1, 1, 0) of FIG. 12, and thus the servo microprocessor 600 knows that the servo head $S_{-9.5}$ must be displaced to the left (i.e., in a positive track sense) to become on-track. The degree of the displacement for the servo head $S_{-9.5}$ is determined by consulting a look up table stored in memory 601. In this regard, the memory 601 has stored therein a required servo displacement value for each of the possible combination of amplitudes for the times $TZ_0$, $TZ_1$, and $TZ_2$. That is, a unique displacement value is stored for a condition when the amplitudes for the times $TZ_0$, $TZ_1$, and $TZ_2$ are 1.0, 1.0, and 0.0, respectively; another displacement value is stored for a condition when the amplitudes are 0.0, 1.0, and 0.0; and so on for each possible permutation of amplitude levels for the times $TZ_0$, $TZ_1$, and $TZ_2$. These displacement values are precalibrated according to known signal amplitudes and required displacements.

It will now be appreciated that various off-track positions of a servo head can be plotted on the reference line 606 to the left or right of the point at which the servo head would cross line 606 if the head were on-track. The distance between the point plotted on line 606 for an off-track servo head and the servo tone area ST0 to be encountered in the direction of head travel varies in accordance with the degree to which the servo head is off-track. Conversely, at times $TZ_0$, $TZ_1$, and $TZ_2$ the amplitudes of the servo signals will vary from what would ordinarily be expected during on-track conditions, and those relative amplitudes provide information for the direction and extent of the required servo head displacement.

Although three sampling times $TZ_0$, $TZ_1$, and $TZ_2$ and three servo sub-zones have been described in the illustrated embodiment, it should be understood that a greater number can be utilized for even finer adjustment provided, of course, that the look-up table 601 is configured and pre-loaded accordingly.

Utilization of the rising edge of the SERVO SYNC signal enables the sampling of servo signal amplitude in a strategic manner that reveals both the direction and extent to which a servo head must be displaced in order to become on-track. The technique of the invention overcomes the non-linearity suffered when servo heads are off-track by more than ½ track pitch. Accordingly, the technique of the invention results in an efficient and accurate determination of the servo head displacement required to achieve proper tracking, eliminating the need to make a prolonged series of iterative adjustments.

Moreover, relative to the SERVO SYNC signal, the helical scan system 30 is able to precisely determine when servo areas should be encountered on a stripe. Preknowledge of the location of the servo areas and of the time at which the servo head is expected to arrive at the servo areas facilitates the use of smaller servo area, leaving more of the tape available for other purposes. In addition, the exactitude of the servo aspects of the helical scan system 30 described herein permit the use of servo signals of frequencies higher than those required by the prior art.

The embodiments of the invention in which an exclusive property or privilege is claimed are defined as follows:

1. A servo tracking method for a helical scan recorder, said helical scan recorder being of the type having a rotating drum past which magnetic tape is transported, and wherein said rotating drum has a head mounted thereon, said method comprising:
   (a) determining a reference-crossing time at which said head begins to cross a reference line drawn with respect to the beginning of a stripe recorded on said tape;
   (b) sampling the amplitude of a servo signal provided on said tape at a first predetermined time after said reference-crossing time; and,
   (c) using said amplitude of said servo signal at said first predetermined time to determine how to adjust the position of said head relative to the pitch of said stripe.

2. The method of claim 1, further comprising:
   sampling the amplitude of a servo signal provided on said tape at second and third predetermined times after said reference-crossing time; and,
   using said amplitude of said servo signal at said second and third predetermined times to adjust the position of said head relative to the pitch of said stripe.

3. The method of claim 1, wherein said step of using said amplitudes involves comparing said amplitudes.

4. The method of claim 1, wherein said step of using said amplitudes involves consulting a look-up table which has servo displacement values stored therein.

5. The method of claim 1, wherein said head begins to cross the beginning of a stripe helically recorded at azimuthal angle A1 on magnetic tape, said head crossing said stripe recorded at angle A1 for the purpose of endeavoring to follow a centerline of said stripe recorded at angle A1, said stripe recorded at angle A1 being adjacent and between two servo area-bearing stripes recorded at an azimuthal angle other than angle A1.

6. The method of claim 5, wherein the beginnings of said two stripes which are adjacent said stripe recorded at angle A1 are separated by a distance $X_{to}$ along said other azimuthal angle, wherein said servo signal is recorded in a servo zone which extends a distance $X_{sa}$ along one of said stripes, and wherein $X_{to} = X_{sa}$.

7. The method of claim 1, wherein said reference line extends parallel to a direction in which said tape is transported past said rotating drum.

8. A servo tracking method for a helical scan recorder, said helical scan recorder being of the type having a rotating drum past which magnetic tape is transported, and wherein said rotating drum has a head mounted thereon, said method comprising:
(a) determining a reference-crossing time at which said head begins to cross a reference line drawn with respect to a stripe recorded on said tape;
(b) sampling the amplitude of a servo signal provided on said tape; and,
(c) using said amplitude of said servo signal and said reference-crossing time to determine how to adjust the position of said head relative to the pitch of said stripe.

9. The method of claim 8, wherein said amplitude is sampled at a first predetermined time after said reference-crossing time.

10. The method of claim 8, wherein said head begins to cross the beginning of a stripe helically recorded at azimuthal angle A1 on magnetic tape, said head crossing said stripe recorded at angle A1 for the purpose of endeavoring to follow a centerline of said stripe recorded at angle A1, said stripe recorded at angle A1 being adjacent and between two servo area-bearing stripes recorded at an azimuthal angle other than angle A1.

11. The method of claim 12, wherein the beginnings of said two stripes which are adjacent said stripe recorded at angle A1 are separated by a distance $X_{to}$ along said other azimuthal angle, wherein said servo signal is recorded in a servo zone which extends a distance $X_{sa}$ along one of said stripes, and wherein $X_{to} = X_{sa}$.

12. The method of claim 8, wherein said reference line extends parallel to a direction in which said tape is transported past said rotating drum.

13. The method of claim 8, wherein said reference line is drawn with respect to the beginning of a stripe recorded on said tape.

14. A helical scan recorder of the type having a rotating drum past which tape is transported, and wherein said rotating drum has a head mounted thereon, said apparatus comprising:
means for determining a reference-crossing time at which said head begins to cross a reference line drawn with respect to the beginning of a stripe recorded on said tape;
means for sampling the amplitude of a servo signal provided on said tape at a first predetermined time after said reference-crossing time; and,
means for using said amplitude of said servo signal at said first predetermined time to determine how to adjust the position of said head relative to the pitch of said stripe.

15. The apparatus of claim 14, further comprising means for comparing the amplitudes of said servo signal at a plurality of predetermined times.

16. The apparatus of claim 15, further comprising a look-up table wherein servo displacement values are stored.

17. The apparatus of claim 14, wherein said head crosses the beginning of a stripe helically recorded at azimuthal angle A1 on magnetic tape, said head crossing said stripe recorded at angle A1 for the purpose of endeavoring to follow a centerline of said stripe recorded at angle A1, said stripe recorded at angle A1 being adjacent and between two servo area-bearing stripes recorded at an azimuthal angle other than angle A1.

18. The apparatus of claim 17, wherein the beginnings of said two stripes which are adjacent said stripe recorded at angle A1 are separated by a distance $X_{to}$ along said other azimuthal angle, wherein said servo signal is recorded in a servo zone which extends a distance $X_{sa}$ along one of said stripes, and wherein $X_{to} = X_{sa}$.

19. The apparatus of claim 14, wherein said reference line extends parallel to a direction in which said tape is transported past said rotating drum.

20. A helical scan recorder of the type having a rotating drum past which tape is transported, and wherein said rotating drum has a head mounted thereon, said apparatus comprising:
means for determining a reference-crossing time at which said head begins to cross a reference line drawn with respect to a stripe recorded on said tape;
means for sampling the amplitude of a servo signal provided on said tape; and,
means for using said amplitude of said servo signal and said reference-crossing time to determine how to adjust the position of said head relative to the pitch of said stripe.

21. The apparatus of claim 20, wherein said head crosses the beginning of a stripe helically recorded at azimuthal angle A1 on magnetic tape, said head crossing said stripe recorded at angle A1 for the purpose of endeavoring to follow a centerline of said stripe recorded at angle A1, said stripe recorded at angle A1 being adjacent and between two servo area-bearing stripes recorded at an azimuthal angle other than angle A1.

22. The apparatus of claim 21, wherein the beginnings of said two stripes which are adjacent said stripe recorded at angle A1 are separated by a distance $X_{to}$ along said other azimuthal angle, wherein said servo signal is recorded in a servo zone which extends a distance $X_{sa}$ along one of said stripes, and wherein $X_{to} = X_{sa}$.

23. The apparatus of claim 20, wherein said reference line extends parallel to a direction in which said tape is transported past said rotating drum.

24. The apparatus of claim 20, wherein said reference line is drawn with respect to the beginning of a stripe recorded on said tape.

* * * * *